(12) United States Patent
Tominaga

(10) Patent No.: US 11,740,525 B2
(45) Date of Patent: Aug. 29, 2023

(54) ACTIVE MATRIX SUBSTRATE AND DISPLAY PANEL

(71) Applicant: Sharp Display Technology Corporation, Kameyama (JP)

(72) Inventor: Masakatsu Tominaga, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/078,428

(22) Filed: Dec. 9, 2022

(65) Prior Publication Data

US 2023/0185142 A1 Jun. 15, 2023

(30) Foreign Application Priority Data

Dec. 14, 2021 (JP) .................................. 2021-202304

(51) Int. Cl.
  *G02F 1/1368* (2006.01)
  *G02F 1/1362* (2006.01)
  *G06F 3/044* (2006.01)

(52) U.S. Cl.
  CPC ...... *G02F 1/136286* (2013.01); *G02F 1/1368* (2013.01); *G02F 1/136222* (2021.01); *G02F 1/136227* (2013.01); *G06F 3/0446* (2019.05); *G06F 3/0447* (2019.05)

(58) Field of Classification Search
  CPC ............. G02F 1/136222; G02F 1/1368; G02F 1/13338; G02F 1/136227; G06F 3/0446; G06F 3/0447
  See application file for complete search history.

(56) References Cited

U.S. PATENT DOCUMENTS

| 2007/0164964 A1 | 7/2007 | Ha |
| 2020/0160803 A1* | 5/2020 | Tominaga ............ G09G 3/3607 |
| 2021/0132453 A1 | 5/2021 | Tominaga et al. |

FOREIGN PATENT DOCUMENTS

| JP | 2007188089 A | 7/2007 |
| WO | 2018221477 A1 | 12/2018 |

* cited by examiner

*Primary Examiner* — James A Dudek
(74) *Attorney, Agent, or Firm* — ScienBiziP, P.C.

(57) ABSTRACT

A first pixel electrode and a third pixel electrode are disposed on one side of one of a plurality of column lines. A second pixel electrode and a fourth pixel electrode are disposed on another side of the one of the plurality of column lines. A third switching element is disposed on the one side of the one of the plurality of column lines. A fourth switching element is disposed on the other side of the one of the plurality of column lines. The first pixel electrode is connected to a first switching element via a first connection electrode. The second pixel electrode is connected to a second switching element via a second connection electrode. The third pixel electrode is connected to the third switching element. The fourth pixel electrode is connected to the fourth switching element.

20 Claims, 27 Drawing Sheets

FIG. 24
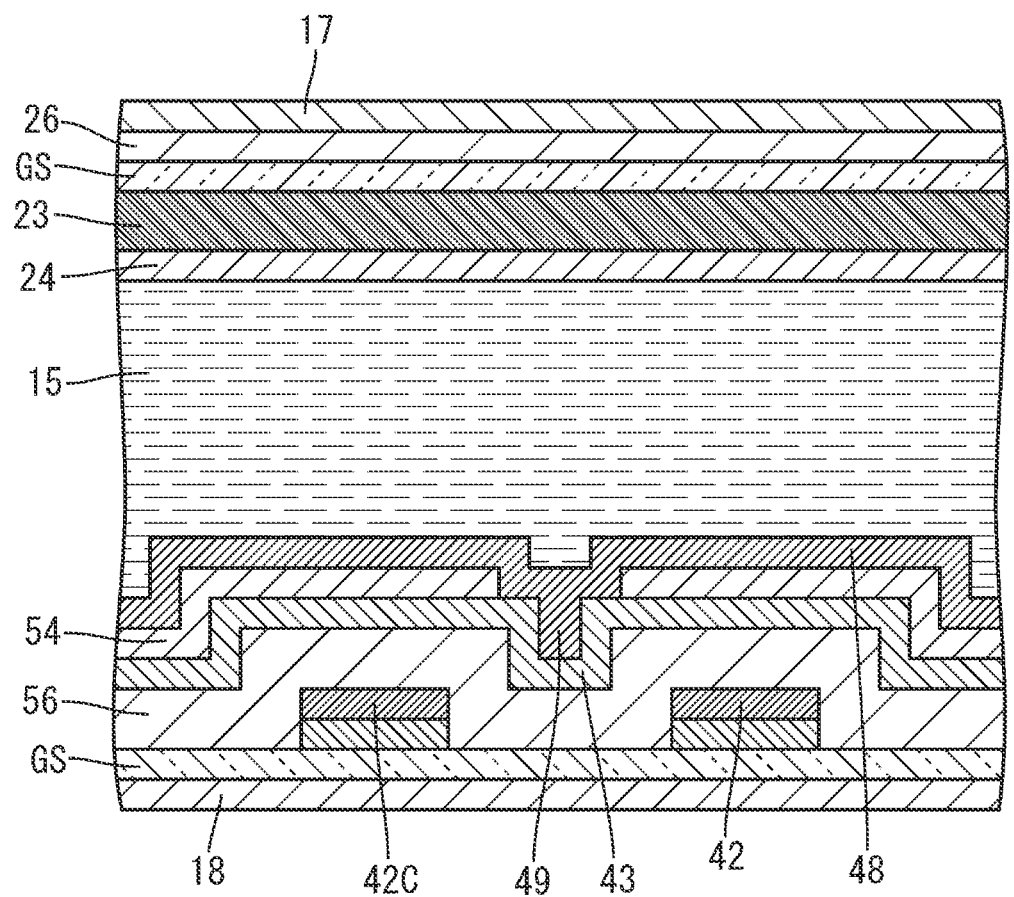
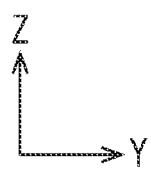

ACTIVE MATRIX SUBSTRATE AND DISPLAY PANEL

CROSS-REFERENCE TO RELATED APPLICATIONS

The present application claims the benefit of priority to Japanese Patent Application, Tokugan, No. 2021-202304 filed on Dec. 14, 2021, the entire contents of which are incorporated herein by reference.

FIELD OF THE INVENTION

The subject technology relates to active matrix substrates and display panels.

BACKGROUND OF THE INVENTION

Conventional liquid crystal panels include a matrix of numerous pixels each including a pixel electrode. The voltage applied to the pixel electrode is fed via a switching element (specifically, TFT), a source line (data line) running in the column direction, and a gate line running in the row direction. The source and gate lines are connected to the switching element. Recent technology proposes to reduce the number of source lines by providing two source lines for every three columns of pixels and providing three gate lines for every two rows of pixels. Japanese Unexamined Patent Application Publication, Tokukai, No. 2007-188089 discloses one of such examples.

The technology of Japanese Unexamined Patent Application Publication, Tokukai, No. 2007-188089 is described as being capable of increasing flexibility in the design of circuits for liquid crystal panels and reducing manufacturing cost.

PCT International Application Publication No. WO2018/221477 discloses an improvement example on the technology of Japanese Unexamined Patent Application Publication, Tokukai, No. 2007-188089. The technology of PCT International Application Publication No. WO2018/221477 can restrain the flickering of the screen caused in reversing the polarity of the voltage applied to a source line for each display frame. In PCT International Application Publication No. WO2018/221477, pixels of the same color (e.g., red pixels) are arranged in the column direction, whereas pixels of different colors (a red, a green, and a blue pixel) are arranged in a repetitive pattern in a fixed order in the row direction. In addition, in the columns of pixels of the same color (e.g., columns of red pixels), a column of pixels each having a pixel electrode to which a positive voltage is applied and a column of pixels each having a pixel electrode to which a negative voltage is applied appear alternately when traced along the row direction. This particular structure renders it unlikely that the voltage on the pixels of the same color (e.g., red pixels) be biased to one of the polarities, thereby restraining flickering.

SUMMARY OF THE INVENTION

Problems to be Solved by the Invention

However, the reality is that the improved technology of PCT International Application Publication No. WO2018/221477 still falls short of sufficiently restraining flickering, except for monotonous displays. Additionally, vertical stripe-like improper displays are likely in intermediate-gray-level displays in which the voltage applied to the pixel electrodes has an intermediate value.

The subject technology has been completed based on this reality and has an object to more reliably restrain improper displays while reducing the number of source lines.

Solution to the Problems (1) An active matrix substrate in accordance with the subject technology includes: a plurality of gate lines extending in a first direction; a plurality of source lines extending in a second direction that intersects with the first direction; a plurality of column lines extending in the second direction; a plurality of switching elements each being connected to one of the plurality of gate lines and one of the plurality of source lines; a plurality of pixel electrodes respectively connected to the plurality of switching elements, the plurality of pixel electrodes being arranged in a matrix in the first direction and in the second direction; and a plurality of connection electrodes that intersect with one of the plurality of column lines via an insulation layer, wherein the plurality of gate lines include a first gate line, a second gate line, and a third gate line, the plurality of source lines include a first source line and a second source line, the plurality of pixel electrodes include a first pixel electrode and a second pixel electrode both disposed in a first row that is parallel to the first direction and a third pixel electrode and a fourth pixel electrode both disposed in a second row that is adjacent to the first row, the plurality of switching elements include a first switching element, a second switching element, a third switching element, and a fourth switching element, the plurality of connection electrodes include a first connection electrode and a second connection electrode, the first pixel electrode and the third pixel electrode are disposed on one side of the one of the plurality of column lines, the second pixel electrode and the fourth pixel electrode are disposed on another side of the one of the plurality of column lines, the third switching element is disposed on the one side of the one of the plurality of column lines, the fourth switching element is disposed on the other side of the one of the plurality of column lines, the first pixel electrode is connected to the first switching element via the first connection electrode, the second pixel electrode is connected to the second switching element via the second connection electrode, the third pixel electrode is connected to the third switching element, and the fourth pixel electrode is connected to the fourth switching element.

(2) Additionally, the aforementioned active matrix substrate, in addition to (1) above, may be such that the first switching element and the second switching element are connected to mutually different gate lines included in the plurality of gate lines and to mutually different source lines included in the plurality of source lines, and the third switching element and the fourth switching element are connected to mutually different source lines included in the plurality of source lines.

(3) Additionally, the aforementioned active matrix substrate, in addition to (1) or (2) above, may be such that the first switching element is connected to the first gate line and the second source line, the second switching element is connected to the second gate line and the first source line, the third switching element is connected to one of the plurality of gate lines excluding the second gate line and to the first source line, and the fourth switching element is connected to the third gate line and the second source line.

(4) Additionally the aforementioned active matrix substrate, in addition to (1) or (2) above, may be such that the first switching element is connected to the second gate line and the second source line, the second switching element is connected to the first gate line and the first source line, the third switching element is connected to one of the plurality of gate lines excluding the first gate line and to the first source line, and the fourth switching element is connected to the third gate line and the second source line.

(5) Additionally, the aforementioned active matrix substrate, in addition to any one of (1) to (4) above, may be such that the third switching element is connected to the third gate line.

(6) Additionally, the aforementioned active matrix substrate, in addition to any one of (1) to (5) above, may be such that when the first source line is fed with a first data voltage, and the second source line is fed with a second data voltage having an opposite polarity to the first data voltage, adjacent pixel electrodes in the plurality of pixel electrodes have different voltage polarities both in the first direction and in the second direction.

(7) Additionally, the aforementioned active matrix substrate, in addition to any one of (1) to (6) above, may be such that the one of the plurality of column lines that intersects with the first connection electrode and the second connection electrode overlaps either one or both of the third pixel electrode and the fourth pixel electrode.

(8) Additionally, the aforementioned active matrix substrate, in addition to (7) above, may be such that the plurality of column lines include a projection that projects toward either one or both of the third pixel electrode and the fourth pixel electrode in such a manner that the projection overlaps either one or both of the third pixel electrode and the fourth pixel electrode.

(9) Additionally, the aforementioned active matrix substrate, in addition to any one of (1) to (8) above, may be such that the first connection electrode and the second connection electrode are provided respectively integral to the first pixel electrode and the second pixel electrode.

(10) Additionally, the aforementioned active matrix substrate, in addition to any one of (1) to (8) above, may be such that the plurality of connection electrodes are provided as members separated from the first pixel electrode and the second pixel electrode.

(11) Additionally, the aforementioned active matrix substrate, in addition to any one of (1) to (10) above, may further include at least one common electrode configured to feed a prescribed reference potential, wherein the one of the plurality of column lines is a common electrode wire connected to the common electrode.

(12) Additionally, the aforementioned active matrix substrate, in addition to (11) above, may be such that the plurality of connection electrodes are partially disposed in a same layer as the common electrode.

(13) Additionally, the aforementioned active matrix substrate, in addition to (11) or (12) above, may be such that the common electrode includes: a plurality of first openings respectively overlapping the plurality of source lines; and a second opening overlapping the common electrode wire.

(14) Additionally, the aforementioned active matrix substrate, in addition to any one of (1) to (13) above, may be such that the common electrode includes a connection portion connected to the common electrode wire, the connection portion overlaps a region between two adjacent gate lines included in the plurality of gate lines, and none of the plurality of pixel electrodes are disposed in the region between the two adjacent gate lines.

(15) Additionally, the aforementioned active matrix substrate, in addition to (1) to (10) above, may further include at least one common electrode configured to feed a prescribed reference potential, wherein the common electrode is divided into a matrix by a slit so as to double as a plurality of sensor electrodes capable of detecting a touch position, and the one of the plurality of column lines doubles as a sensor electrode wire connected to one of the plurality of sensor electrodes.

(16) Additionally, the aforementioned active matrix substrate, in addition to (15) above, may be such that the plurality of column lines include a short-circuit line connecting a plurality of points in each of the plurality of sensor electrodes and having a length shorter than twice a length of the plurality of sensor electrodes in the second direction.

(17) Additionally, the aforementioned active matrix substrate, in addition to (15) or (16) above, may be such that the common electrode includes a connection portion connected to the sensor electrode wire, the slit partially overlaps a region between two adjacent gate lines included in the plurality of gate lines, none of the plurality of pixel electrodes are disposed in the region between the two adjacent gate lines, and the slit does not overlap the connection portion.

(18) Additionally, the aforementioned active matrix substrate, in addition to any one of (1) to (17) above, may be such that further include at least one common electrode configured to feed a prescribed reference potential, wherein the one of the plurality of column lines is a common electrode wire connected to the common electrode, the active matrix substrate further including: a source driver configured to feed a data voltage to the plurality of source lines; a first draw-out line connecting the first source line and the source driver; a second draw-out line connecting the second source line and the source driver; and a third draw-out line connecting the common electrode wire and the source driver, the first draw-out line and the third draw-out line at least partially include a first metal film, and the second draw-out line includes a second metal film disposed in a different layer than the first metal film.

(19) Additionally, the aforementioned active matrix substrate, in addition to (18) above, may be such that the third draw-out line has a multilayer structure including the first metal film and the second metal film.

(20) A display panel in accordance with the subject technology may include: the active matrix substrate of any one of (1) to (19) above; and a color filter including a plurality of coloring sections opposite the plurality of pixel electrodes, wherein the plurality of coloring sections include a first coloring section, a second coloring section, and a third coloring section of mutually different colors, and in the plurality of coloring sections, the first coloring section, the second coloring section, and the third coloring section are arranged in a repetitive pattern in a fixed order in the first direction in such a manner that a same color appears in the second direction.

(21) Additionally, the aforementioned display panel, in addition to (20) above, may further includes a liquid crystal layer of liquid crystal molecules that change alignment with a voltage applied to the plurality of pixel electrodes.

Advantageous Effects of the Invention

The technology described in the specification of the present application is capable of more reliably restraining improper displays while reducing the number of source lines.

BRIEF DESCRIPTION OF DRAWINGS

FIG. 24 is a cross-sectional view of a liquid crystal panel in accordance with another embodiment taken along line shown in FIGS. 6 and 8.

DESCRIPTION OF EMBODIMENTS

Embodiment 1

Figure 1:
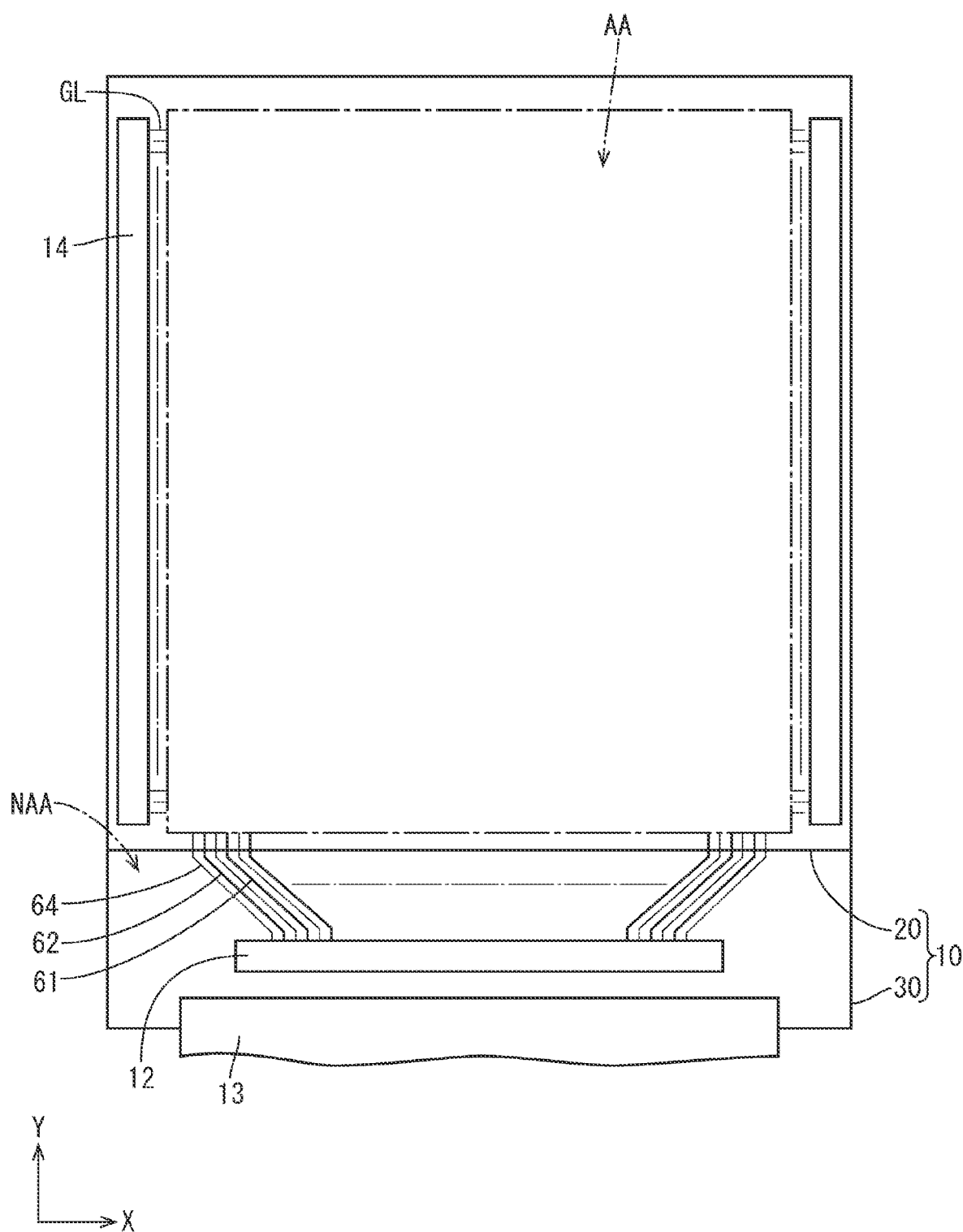
FIG. 1 is a plan view of a liquid crystal panel in accordance with an embodiment.

Embodiment 1 of the subject technology will be described with reference to FIGS. 1 to 12. The present embodiment will discuss as an example a liquid crystal display device 100 (an example of a display device) including a liquid crystal panel 10 (an example of a display panel). Note that each drawing shows an X-axis, a Y-axis, and a Z-axis in a part thereof and is prepared in such a manner that the directions indicated by these axes are common to all drawings. In addition, in each cross-sectional view, the upper side of the drawing coincides with the front side (display surface side) of the liquid crystal panel 10, and the lower side coincides with the backside (rear side) of the liquid crystal panel 10.

The liquid crystal display device 100, roughly, includes the liquid crystal panel 10 and a known backlight device (lighting device) for projecting light onto the liquid crystal panel 10. The liquid crystal panel 10 has a surface divided into a display area (active area) AA and a non-display area (non-active area) NAA as shown in FIG. 1. The display area AA sits in the center of the surface to display images. The non-display area NAA sits around the display area AA like a frame and displays no images. In FIG. 1, a dash-dot line indicates the profile of the display area AA, and the area outside the dash-dot line is the non-display area NAA. The liquid crystal panel 10 is shown as having a portrait-oriented rectangular shape in the plan view of FIG. 1, but may have a different shape.

The non-display area NAA is provided with a source driver 12 and two GDM circuit (gate driver monolithic circuit) units 14 to drive the liquid crystal panel 10. The source driver 12 is an LSI chip with a built-in source driver circuit. Each GDM circuit unit 14 is a gate driver circuit provided monolithically on a substrate 30. The source driver 12 and the GDM circuit units 14 are connected to a flexible substrate 13 an edge portion of which is mounted to the non-display area NAA. The other edge portion of the flexible substrate 13 is connected to an external control board that is a supply source of various signals.

Figure 2:
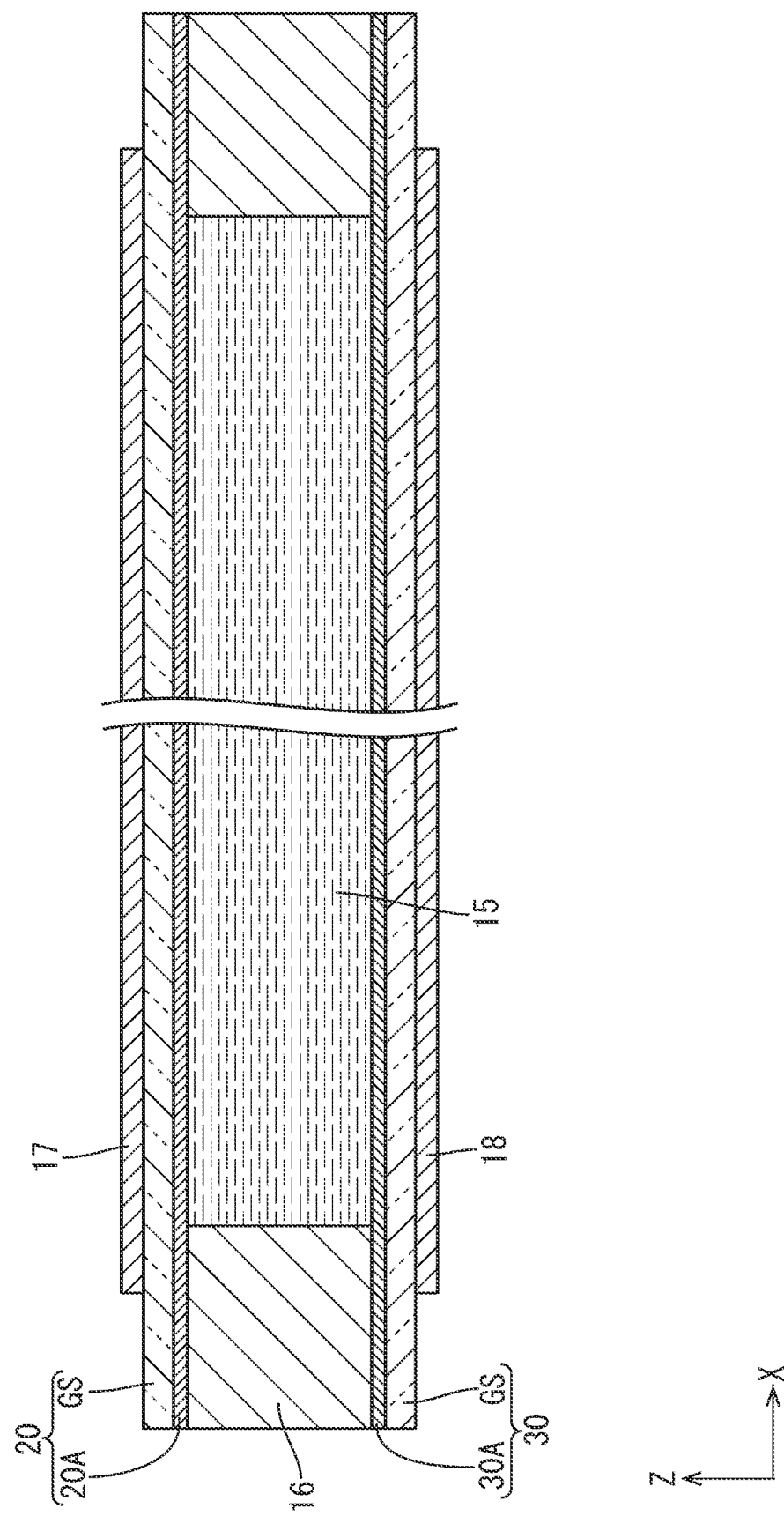
FIG. 2 is a cross-sectional view of the liquid crystal panel.

The liquid crystal panel 10, as shown in the cross-sectional view of FIG. 2, includes two substrates (a substrate 20 and the substrate 30), a liquid crystal layer 15, a sealing section 16, and two polarizers 17, 18. The liquid crystal layer 15 is a medium layer containing liquid crystal molecules and is interposed between the substrates 20, 30. The sealing section 16 joins the peripheral portions of the substrates 20, 30 together to seal the liquid crystal layer 15. The polarizers 17, 18 are attached respectively to the external sides of the substrates 20, 30 that are joined together. Of the substrates 20, 30, the front side substrate is a CF substrate (color filter substrate, opposite substrate) 20, and the backside substrate is an active matrix substrate (array substrate, TFT substrate) 30. The CF substrate 20 and the active matrix substrate 30 each include a glass substrate GS having an inner face side on which a stack of various patterned thin films 20A, 30A is provided. The various thin films 20A, 30A are formed by stacking each film on the glass substrate GS by known photolithography and thereafter applying an alignment film to align the liquid crystal molecules in the liquid crystal layer 15. The alignment film is made of an insulating material such as a polyimide resin.

Figure 3:
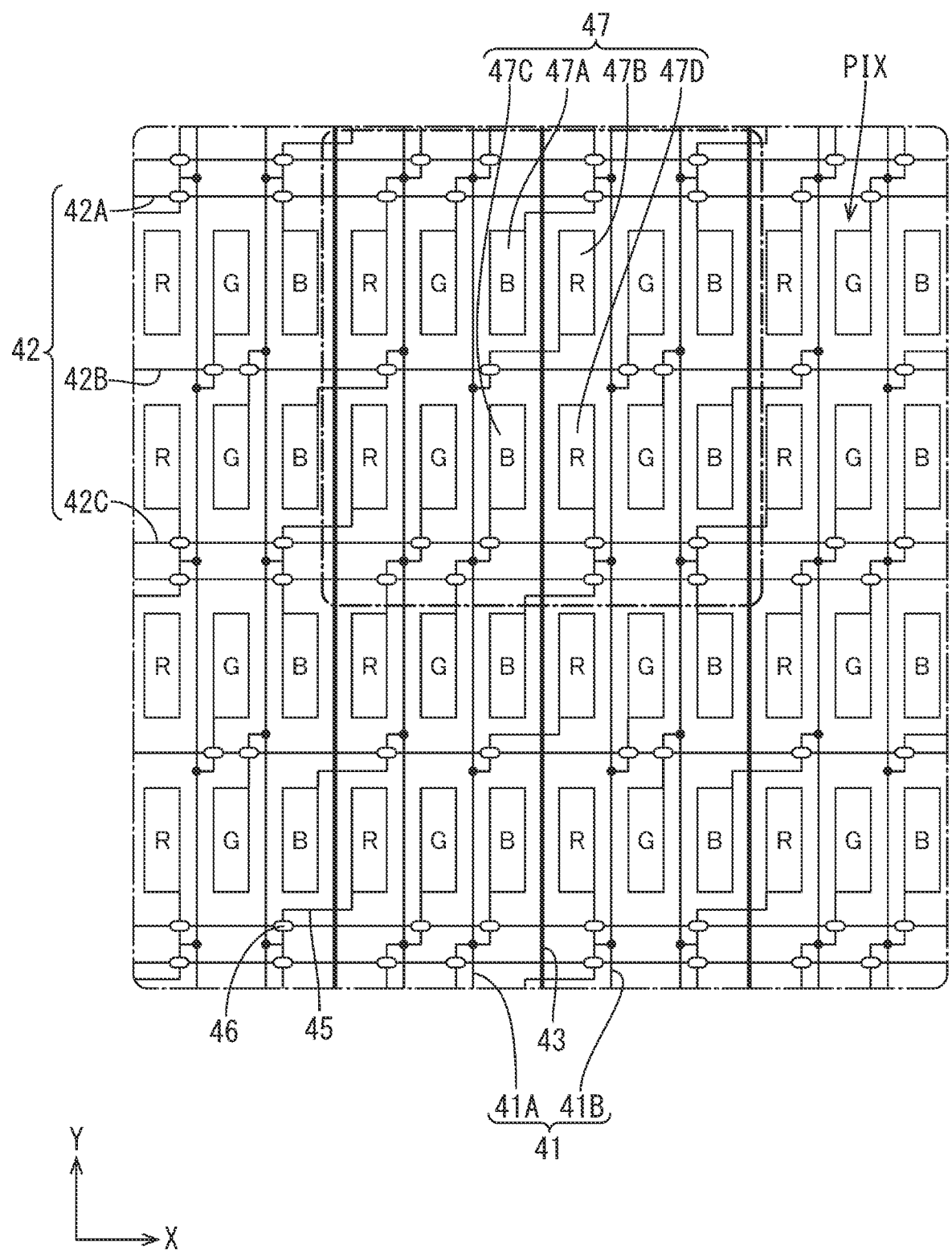
FIG. 3 is a schematic plan view of a structure of a display area of an active matrix substrate.

As shown in the plan view of FIG. 3, the display area AA of the active matrix substrate 30 is provided with a plurality of source lines (data lines, signal lines) 41, a plurality of gate lines (scan lines) 42, a plurality of common electrode wires 43 (an example of column lines), a plurality of TFTs (thin film transistors) 46 (an example of switching elements), a plurality of pixel electrodes 47, a common electrode 48, and a plurality of connection electrodes 45. The gate lines 42 extend in the X-axis direction (an example of the row direction (first direction)). The gate lines 42, as shown in FIG. 1, are extended on the left and right sides thereof to the non-display area NAA and connected to either one or both of the two GDM circuit units 14. The gate lines 42 are fed with a gate voltage (scan signal) from the GDM circuit units 14.

The source lines 41 extend in the Y-axis direction (an example of the column direction (second direction)) intersecting with the gate lines 42 as shown in FIG. 3. The source lines 41 are, as shown in FIG. 1, connected to the source driver 12 via first draw-out lines 61 or second draw-out lines 62 in the non-display area NAA. The source lines 41 are fed with a data voltage (image signals) from the source driver 12. The data voltage is fed by a frame-reversal driving scheme in which the polarity of each source line 41 is reversed for each display frame. This arrangement can restrain a phenomenon called image sticking in which the liquid crystal molecules in the liquid crystal layer 15 point in a particular direction. The data voltage is fed in such a manner that two adjacent source lines 41 have opposite voltage polarities in each display frame. Approximately half of the source lines 41 are connected to the first draw-out lines 61 and fed with a data voltage of one of the polarities (e.g., positive polarity) via the first draw-out lines 61. The remaining, approximately half of the source lines 41 are connected to the second draw-out lines 62 and fed with a data voltage of the other polarity (e.g., negative polarity) via the second draw-out lines 62.

The common electrode wires 43 extend in the Y-axis direction and are connected to the source driver 12 via third draw-out lines 64 in the non-display area NAA. The common electrode wires 43 are fed with a prescribed reference potential from the source driver 12. The common electrode wires 43 are not connected to the TFTs 46. Note that the language, "not connected to the TFTs 46," means "electrically connected directly to none of drain electrodes 46R, source electrodes 46S, and gate electrodes 46G of the TFTs 46."

The pixel electrodes 47 have a portrait-oriented, substantially rectangular shape and are arranged in a matrix. Each TFT 46 is connected to a different one of the pixel electrodes 47. The drain electrode 46R, the source electrode 46S, and the gate electrode 46G of each TFT 46 are connected respectively to one of the pixel electrodes 47, one of the source lines 41, and one of the gate lines 42.

Figure 4:
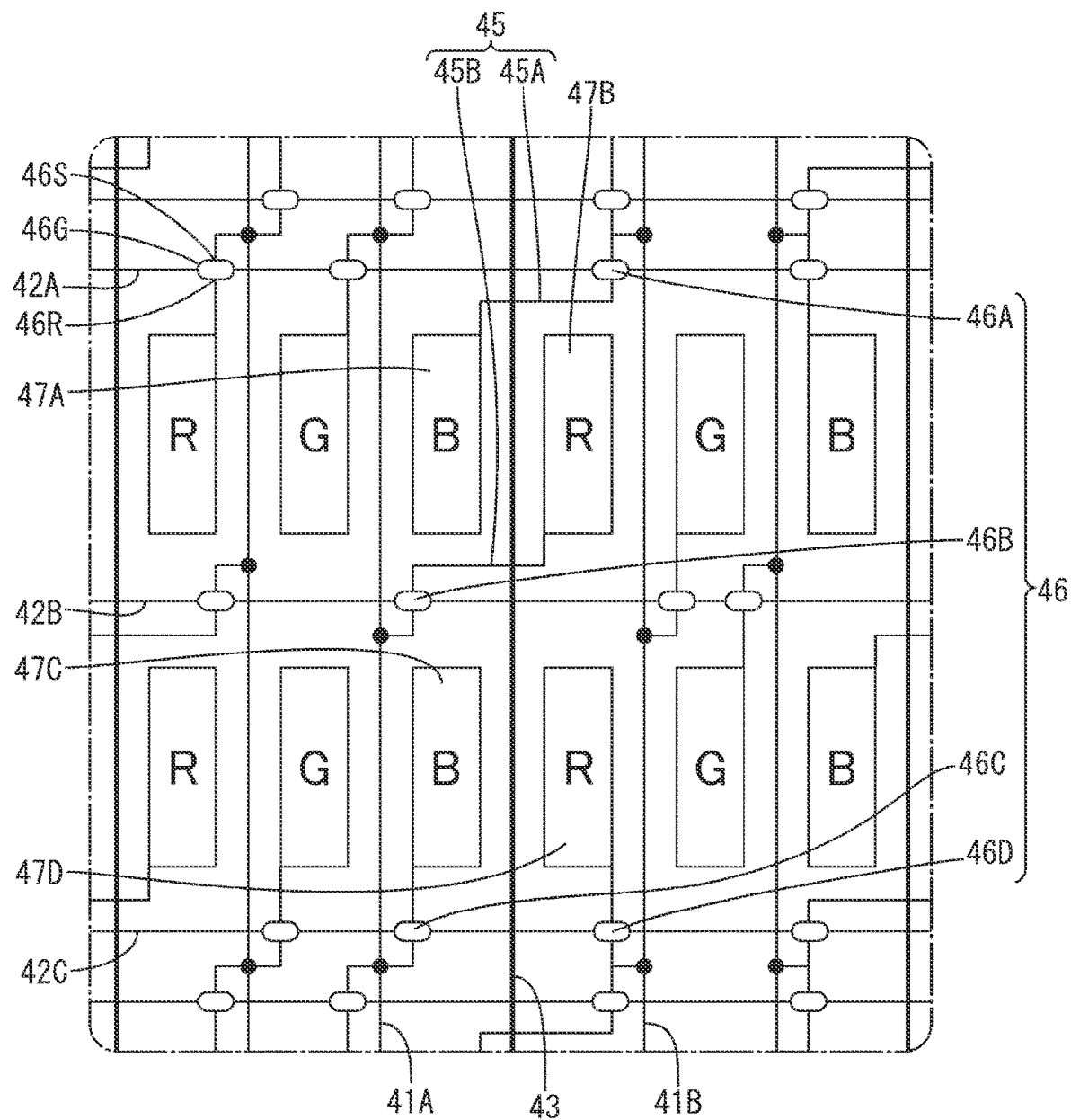
FIG. 4 is a partial enlarged view of FIG. 3.

The common electrode 48, although being omitted in FIGS. 3 and 4 (partial enlarged views), is provided substantially across the entire display area AA. The common electrode 48 is connected to the common electrode wires 43 to feed the prescribed reference potential via the common electrode wires 43.

The potential difference between the pixel electrodes 47 and the common electrode 48 changes when a gate voltage is applied to the TFTs 46 via the gate lines 42 and a data voltage is applied to the TFTs 46 via the source lines 41. The electric field across the liquid crystal layer 15 is controlled through this potential difference, so that the alignment of the liquid crystal molecules is switched in a suitable manner to drive the liquid crystal panel 10. The common electrode 48 has third openings 52 as will be described later, which causes a phenomenon called a fringe field (oblique electric field) between the common electrode 48 and the pixel electrodes 47. Therefore, the liquid crystal panel 10 operates in "FFS (fringe field switching) mode." Note that the openings for generating a fringe field may be provided in the pixel electrodes 47. Additionally, the liquid crystal panel 10 may operate in a mode other than FFS (e.g., in IPS (in-plane-switching) mode).

Figure 9:
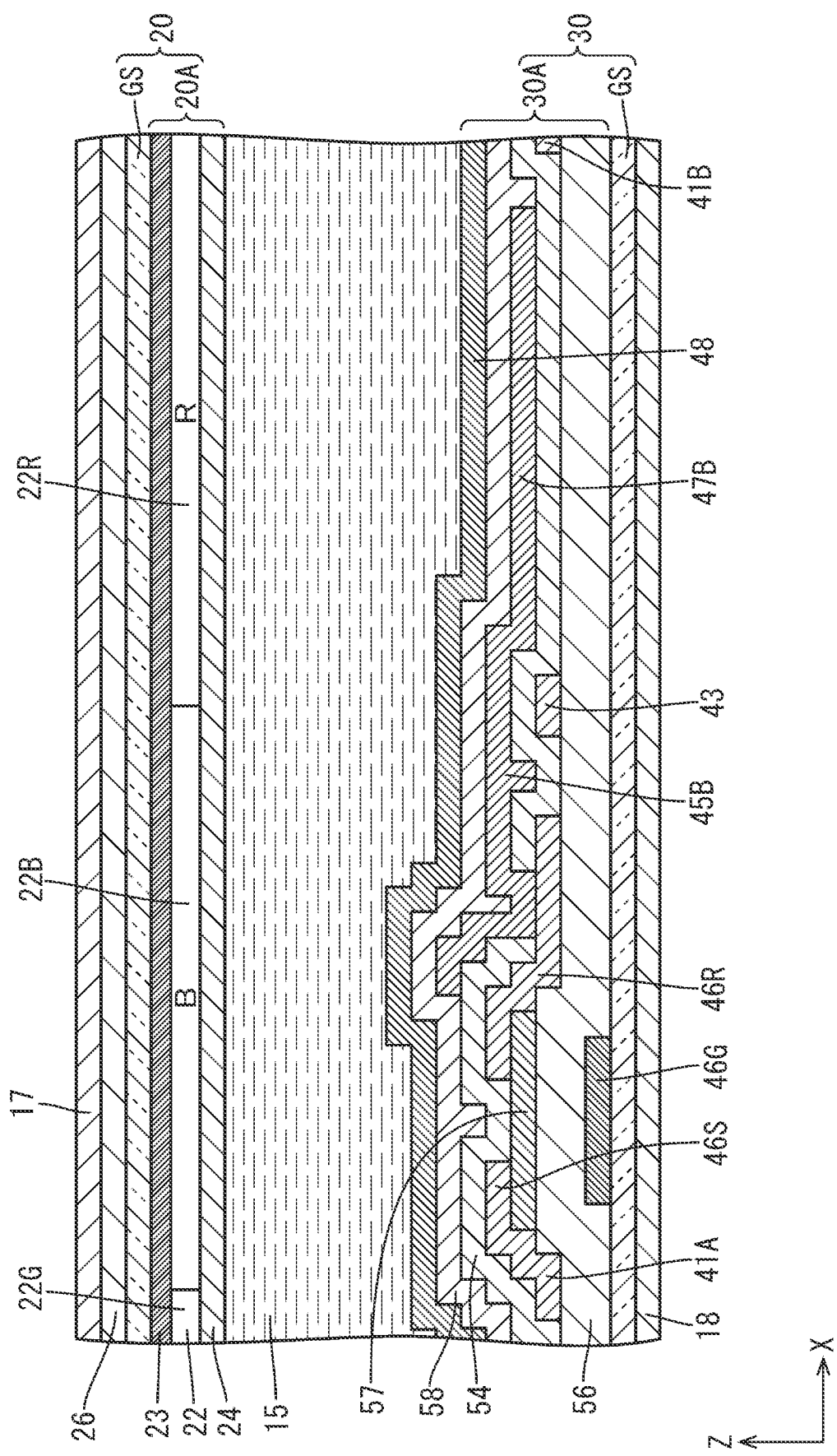
FIG. 9 is a cross-sectional view of a liquid crystal panel taken along line I-I shown in FIGS. 6 and 8.
Figure 10:
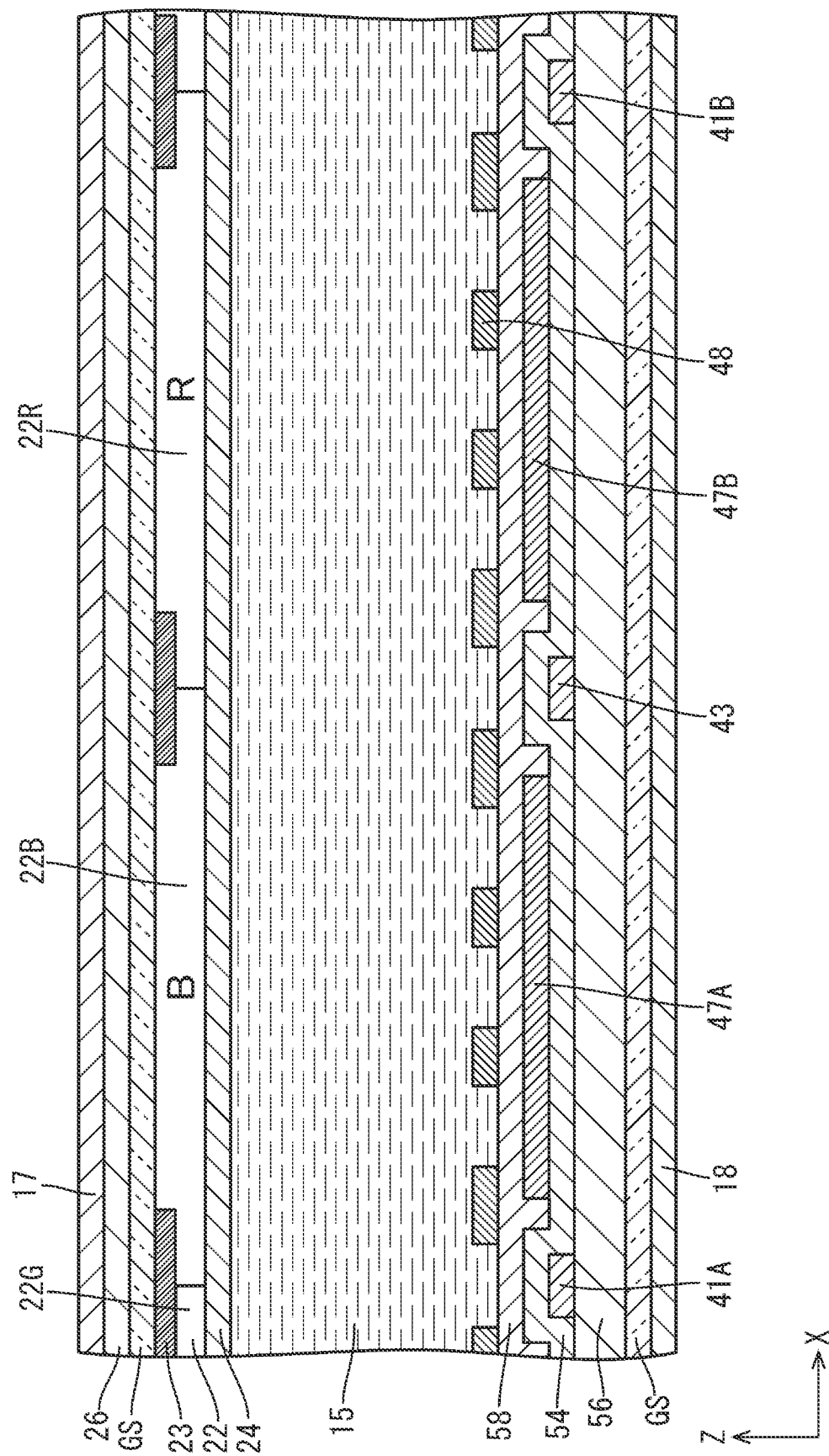
FIG. 10 is a cross-sectional view of a liquid crystal panel taken along line II-II shown in FIGS. 6 and 8.
Figure 11:
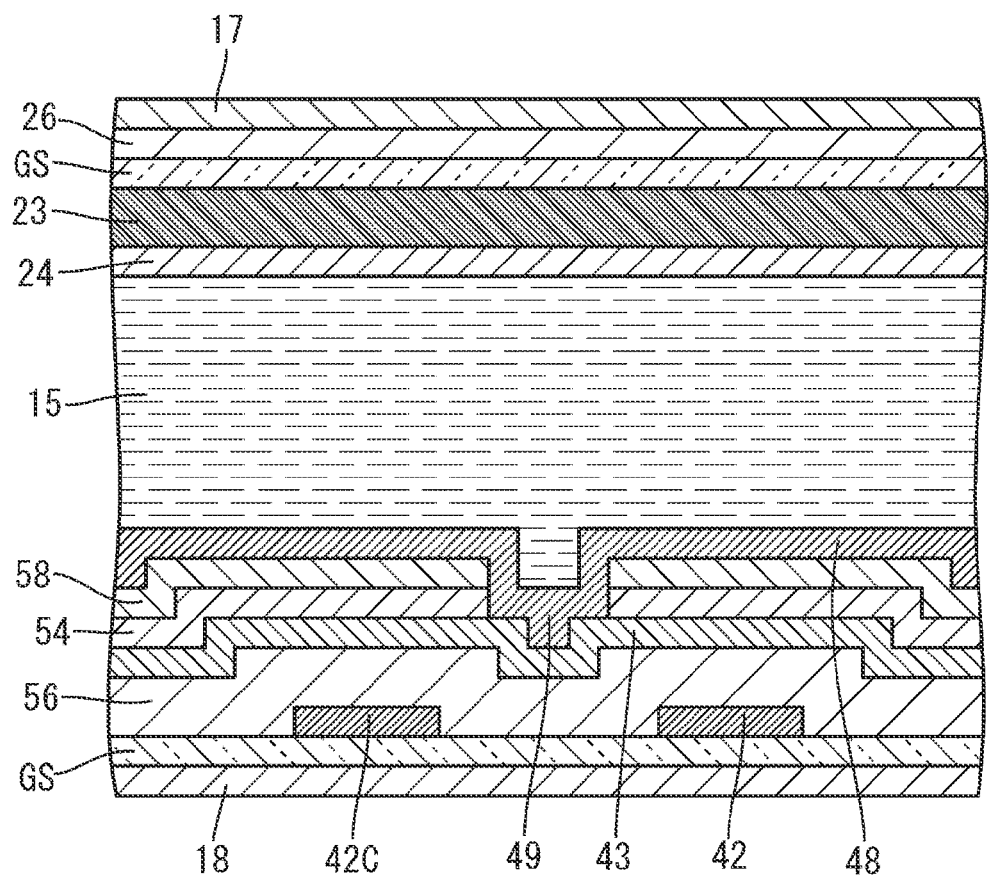
FIG. 11 is a cross-sectional view of a liquid crystal panel taken along line shown in FIGS. 6 and 8.

The display area AA of the CF substrate 20, as shown in the cross-sectional views of FIGS. 9 to 11, includes color filters 22, a light-blocking section (black matrix) 23, and an overcoat film 24. The color filters 22 include coloring sections 22R, 22G, 22B of three colors (red, green, and blue (R, G, and B)). Each coloring section 22R, 22G, 22B transmits light in a wavelength range corresponding to the associated color. The coloring sections 22R, 22G, 22B are arranged in a matrix on the active matrix substrate 30 in a location opposite the pixel electrodes 47. The coloring sections 22R, 22G, 22B are arranged in a repetitive pattern in the order of red, green, and blue in the row direction, whereas in the column direction, those of the same color are arranged next to each other. The black matrix 23 has such a lattice-like shape as to overlap the gate lines 42, the source lines 41, the common electrode wires 43, and the TFTs 46 on the active matrix substrate 30. In addition, an antistatic conductive layer 26 is provided as a common layer substantially across the entire external side of the CF substrate 20. Note that FIG. 2 omits the conductive layer 26.

A pair of a coloring section of one of the colors and one of the pixel electrodes 47 opposite this coloring section makes up a unit that is a single pixel PIX (picture element, subpixel). Each letter, "R," "G," and "B," with which the pixel electrodes 47 are labelled in the plan views of FIGS. 3 to 6 indicates which of a R pixel, a G pixel, and a B pixel the pixel including the pixel electrodes 47 is. The pixels PIX are arranged in a matrix. With three pixels (a R pixel, a G pixel, and a B pixel) as one display unit, the liquid crystal panel 10 produces a color display with prescribed coloration for each display unit. In the present embodiment, the wiring pattern of four R pixels, four G pixels, and four B pixels shown in FIG. 4 is repeated in the row and column directions.

As shown in FIGS. 3 to 4, three gate lines 42 are provided for every two adjacent rows of pixels. The gate lines 42 include a first gate line 42A, a second gate line 42B, and a third gate line 42C. The first gate line 42A and the second gate line 42B are adjacent to each other across the pixel electrode 47. The second gate line 42B and the third gate line 42C are adjacent to each other across the pixel electrode 47.

As shown in FIGS. 3 to 4, two source lines 41 are provided for every three adjacent columns of pixels. The source lines 41 include a first source line 41A and a second source line 41B. The first source line 41A is located on a side of the common electrode wire 43, whereas the second source line 41B is located on the other side of the common electrode wire 43.

The TFTs 46, as shown in FIG. 4, include a first TFT 46A, a second TFT 46B, a third TFT 46C, and a fourth TFT 46D. The first TFT 46A and the fourth TFT 46D are connected to the second source line 41B. The second TFT 46B and the third TFT 46C are connected to the first source line 41A. In addition, the first TFT 46A is connected to the first gate line 42A, the second TFT 46B is connected to the second gate line 42B, and the fourth TFT 46D is connected to the third gate line 42C. The third TFT 46C needs only to be connected to any of the gate lines 42 excluding the second gate line 42B and is connected to the third gate line 42C in the present embodiment.

As shown in FIGS. 3 and 4, one common electrode wire 43 is provided for every three adjacent columns of pixels. The common electrode wires 43, provided in large numbers between the first source line 41A and the second source line 41B, reduce resistance distribution in the common electrode 48, thereby enabling stabilizing the reference potential. It also becomes possible to utilize the common electrode wires 43 as sensor electrode wires 143A for touch panel function, as will be described later in Embodiment 2.

As shown in FIGS. 3 to 4, the connection electrode 45 intersects with the common electrode wire 43 and connects the pixel electrode 47 and the TFT 46. The connection electrode 45 includes a first connection electrode 45A and a second connection electrode 45B.

As shown in FIG. 3, each pixel electrode 47 is, depending on the position thereof in the column direction, connected to a different one of the source lines 41 via one of the TFT 46. The pixel electrode 47 includes a first pixel electrode 47A and a second pixel electrode 47B both disposed in a first row and a third pixel electrode 47C and a fourth pixel electrode 47D both disposed in a second row that is adjacent to the first row. The first pixel electrode 47A and the third pixel electrode 47C are located on a side of the common electrode wire 43 in the row direction (left side in FIG. 3), and the second pixel electrode 47B and the fourth pixel electrode 47D are located on the other side of the common electrode wire 43 in the row direction (right side in FIG. 3). The first pixel electrode 47A is connected to the first TFT 46A via the first connection electrode 45A, and the second pixel electrode 47B is connected to the second TFT 46B via the second connection electrode 45B. The third pixel electrode 47C is connected to the third TFT 46C, and the fourth pixel electrode 47D is connected to the fourth TFT 46D.

Figure 5:
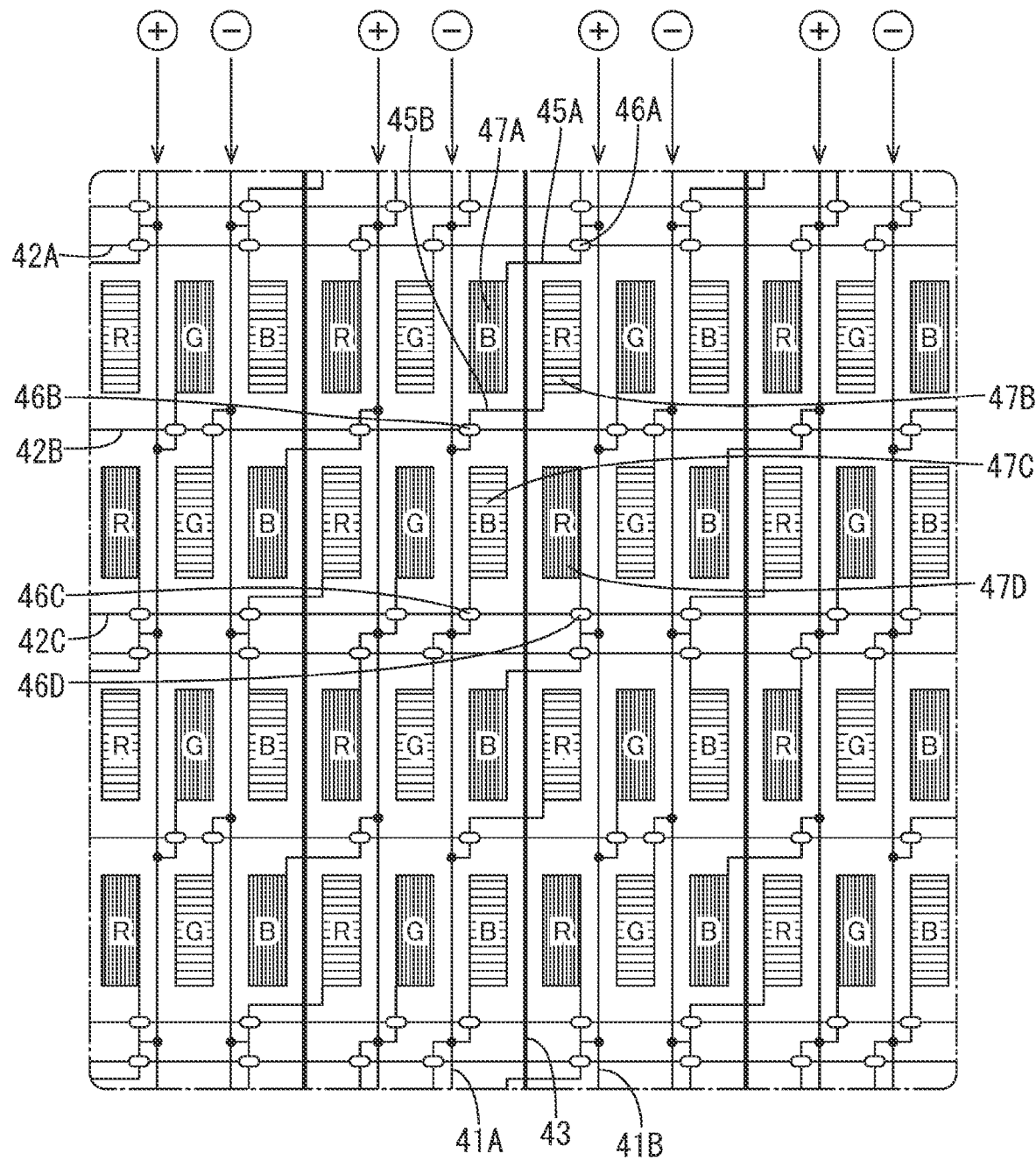
FIG. 5 is a plan view illustrating the voltage polarities of pixel electrodes.
Figure 6:
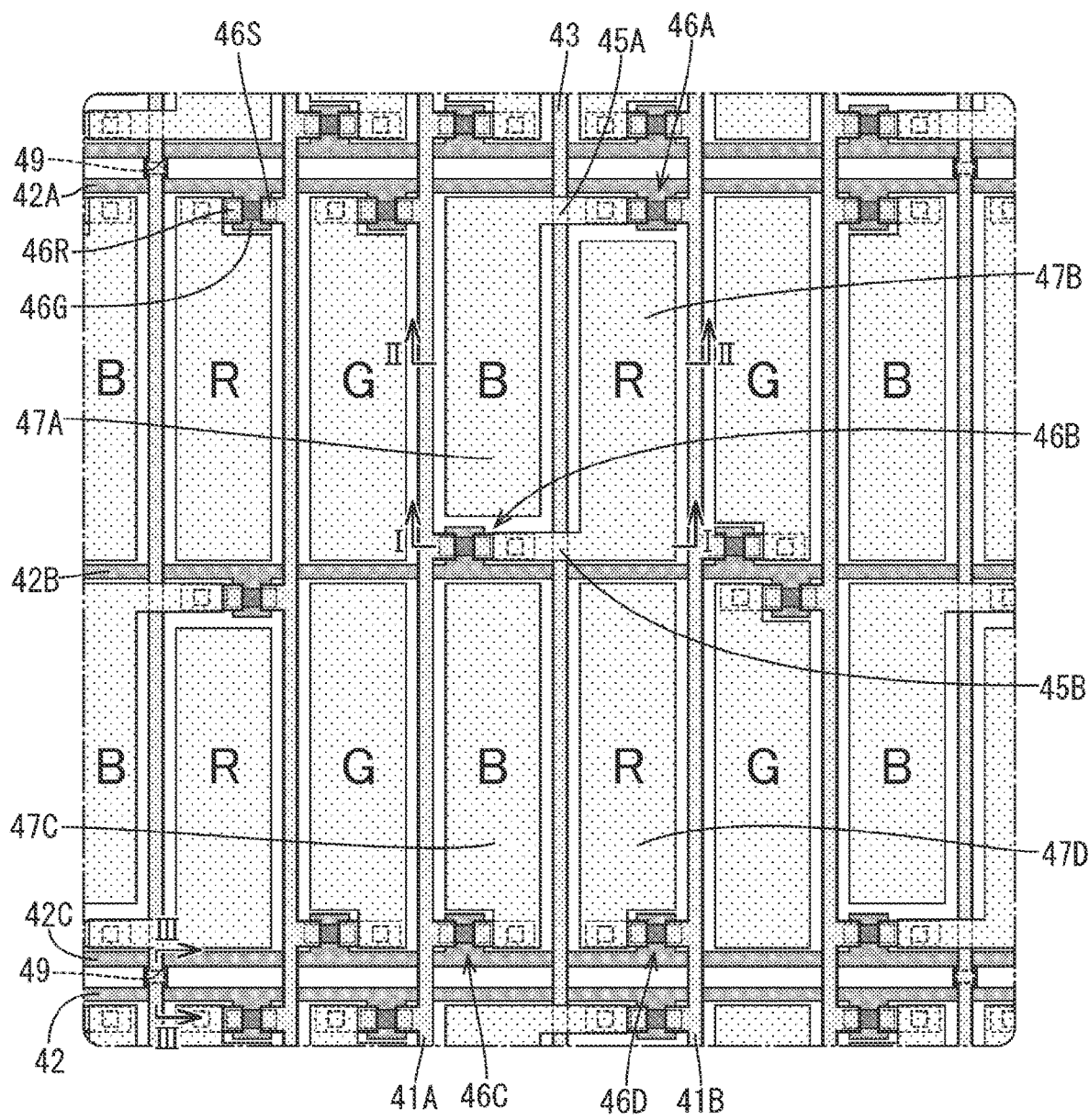
FIG. 6 is a plan view of a wiring layout pattern for FIG. 4.

In this wiring structure, as shown in the plan view of FIG. 5, when data voltages of opposite polarities are applied to adjacent source lines 41, the voltage polarity of the pixel electrode 47 alternates from one to next both in the column and row directions. For instance, when a data voltage of negative polarity is applied to the first source line 41A, and a data voltage of positive polarity is applied to the second source line 41B, the voltage polarity of the first pixel electrode 47A connected to the second source line 41B via the first TFT 46A is positive (indicated by vertical stripes in FIG. 5), and the voltage polarity of the fourth pixel electrode 47D connected to the second source line 41B via the fourth TFT 46D is positive. In addition, the voltage polarity of the second pixel electrode 47B connected to the first source line 41A via the second TFT 46B is negative (indicated by lateral stripes in FIG. 5), and the voltage polarity of the third pixel electrode 47C connected to the first source line 41A via the third TFT 46C is negative.

Therefore, the liquid crystal panel 10 is structured so as to be capable of a method called dot-reversal drive in which when data voltages of opposite polarities are applied to adjacent source lines 41, the voltage polarity of the pixel electrode 47 is reversed for each pixel (dot). In dot-reversal drive, the voltage polarity of the pixel electrode 47 is unlikely to be biased to one of the polarities both in the column and row directions, thereby restraining flickering and stripe-like improper displays. In addition, in dot-reversal drive, power consumption can be reduced due to the reversing of the polarity of every source line 41 for each display frame.

A description is given next of a plan-view layout pattern of the aforementioned wiring structure. As shown in the plan view of FIG. 6 and the cross-sectional view of FIG. 9, the second pixel electrode 47B is connected to the drain electrode 46R of the second TFT 46B via the second connection electrode 45B. The second connection electrode 45B intersects with the common electrode wire 43 via a first interlayer insulation film 54 (an example of an insulation layer). The second connection electrode 45B is connected to a part of the second pixel electrode 47B and projects from the second pixel electrode 47B over the common electrode wire 43 to a location where the second connection electrode 45B overlaps the drain electrode 46R of the second TFT 46B. The second connection electrode 45B is formed in the same layer as the second pixel electrode 47B (a first transparent electrode film detailed later) and integral to the second pixel electrode 47B. The second connection electrode 45B projects to reach, in the same layer as the second pixel electrode 47B (first transparent electrode film), a pixel that is not the pixel overlapping the black matrix 23 (detailed later) and containing the second pixel electrode 47B. The second connection electrode 45B is connected through a layer to the drain electrode 46R via a contact hole. The provision of the second connection electrode 45B enables connecting the second pixel electrode 47B and the drain electrode 46R across the common electrode wire 43. Since the first interlayer insulation film 54 is interposed between the second connection electrode 45B and the common electrode wire 43, there occurs no leak current between the second connection electrode 45B and the common electrode wire 43. A parasitic capacitance (auxiliary capacitance) C45 is produced instead between the second connection electrode 45B and the common electrode wire 43. The first connection electrode 45A has the same structure as the second connection electrode 45B described above, and redundant description is therefore omitted.

Figure 7:
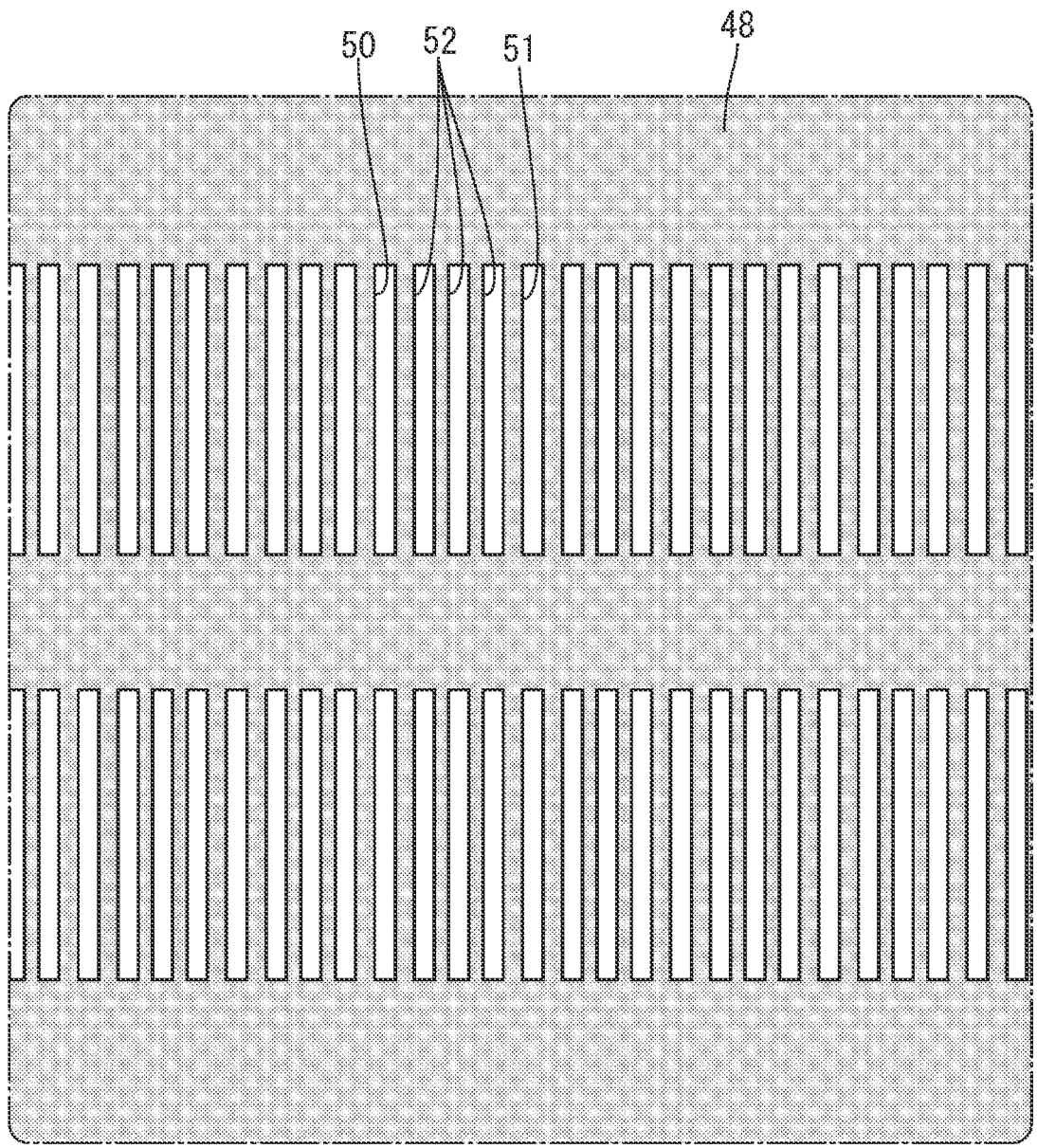
FIG. 7 is a plan view of a wiring layout pattern for a common electrode.
Figure 8:
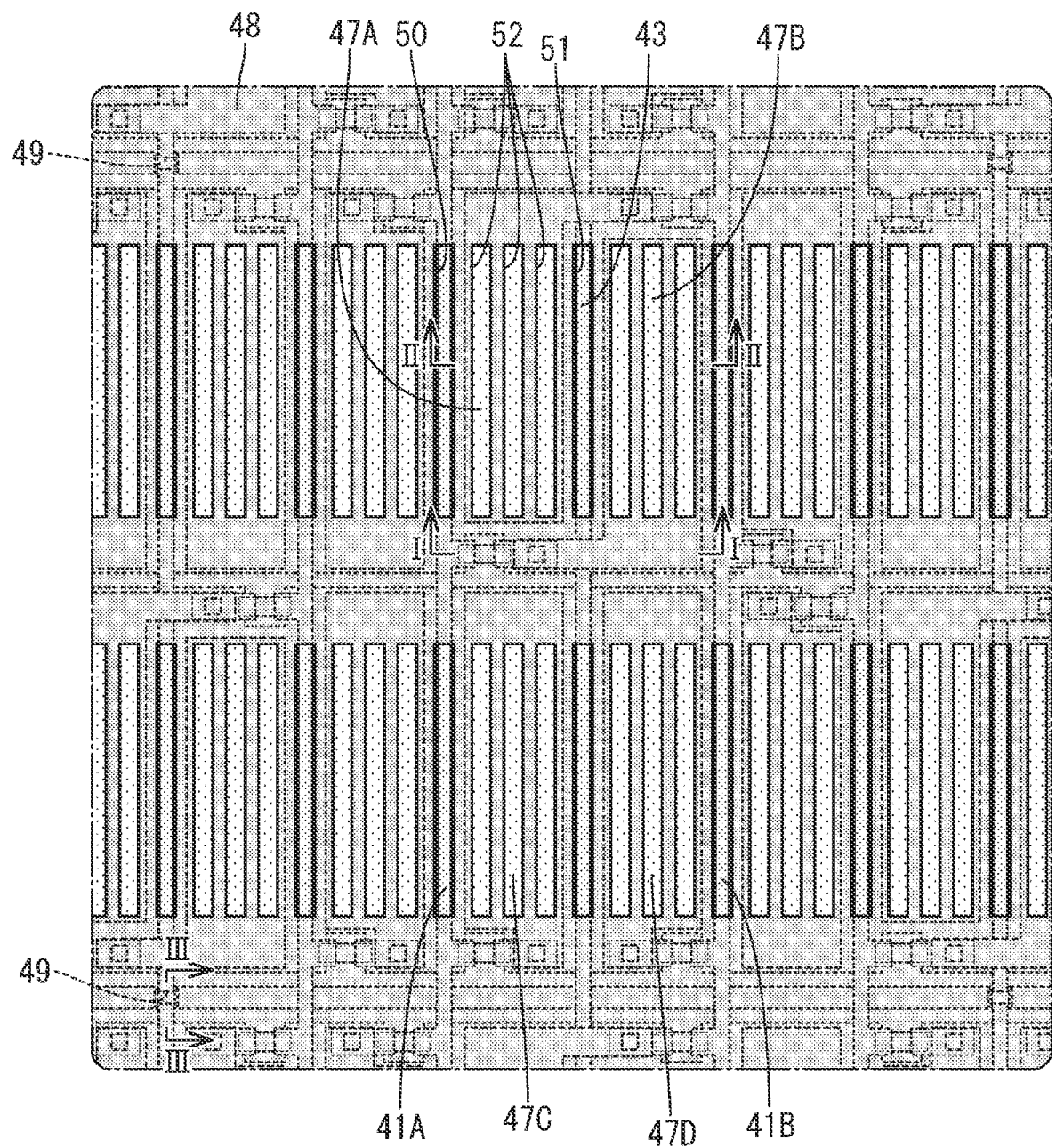
FIG. 8 is a plan view obtained by superimposing FIGS. 6 and 7.

The common electrode 48 has, as shown in the plan views of FIGS. 7 to 8, a plurality of first openings 50, a plurality of second openings 51, and the plurality of third openings 52. The first opening 50 overlaps the source line 41. The first opening 50 reduces parasitic capacitance between the common electrode 48 and the source line 41. The second opening 51 overlaps the common electrode wire 43. The second opening 51 reduces parasitic capacitance between the common electrode 48 and the common electrode wire 43. The third opening 52 overlaps the pixel electrodes 47, and three third openings 52 are formed for each pixel electrode 47. Each third opening 52 has a width (row-wise length) of approximately a few micrometers.

The common electrode 48 includes connection portions 49 (interlayer connection portion) connected to the common electrode wires 43. As shown in the plan view of FIG. 8 and the cross-sectional view of FIG. 11, the connection portion 49 overlaps a region between two gate lines 42 where no pixel electrode 47 is provided. This region between two gate lines 42 overlaps the black matrix 23 (detailed later) and does not contribute to displays. In addition, the region between two gate lines 42 is separated by some distance from the pixel electrode 47. Furthermore, since the two gate lines 42 are positioned at a prescribed distance from each other in view of the yield, the region between two gate lines 42 has a space to accommodate the connection portion 49. Accordingly, the provision of the connection portion 49 in the region between two gate lines 42 prevents, for example, falling aperture ratios and irregular alignment of the liquid crystal layer 15, thereby enabling effective use of available space.

A description is given next of a layer structure of the active matrix substrate 30 with reference to cross-sectional views of FIGS. 9 to 11. The gate electrode 46G and the gate line 42 of the TFT 46 include a gate metal film (an example of a first metal film) stacked on the glass substrate GS. The source electrode 46S, the drain electrode 46R, the source line 41, and the common electrode wire 43 of the TFT 46 include a source metal film (an example of a second metal film). The source metal layer is stacked on the upper layer side of the gate metal film via a gate insulation film 56. The TFT 46 is a bottom-gate TFT. In the formation area for these, a semiconductor film 57 that will be a channel region for the TFT 46 is stacked between the gate insulation film 56 and the source metal film. The first interlayer insulation film (passivation film) 54 is stacked on the source metal film. The pixel electrode 47 includes the first transparent electrode film stacked on the first interlayer insulation film 54. The common electrode 48 includes a second transparent electrode film stacked on the upper layer side of the first transparent electrode film via a second interlayer insulation film (passivation film) 58. Note that these cross-sectional views omit alignment films.

Figure 12:
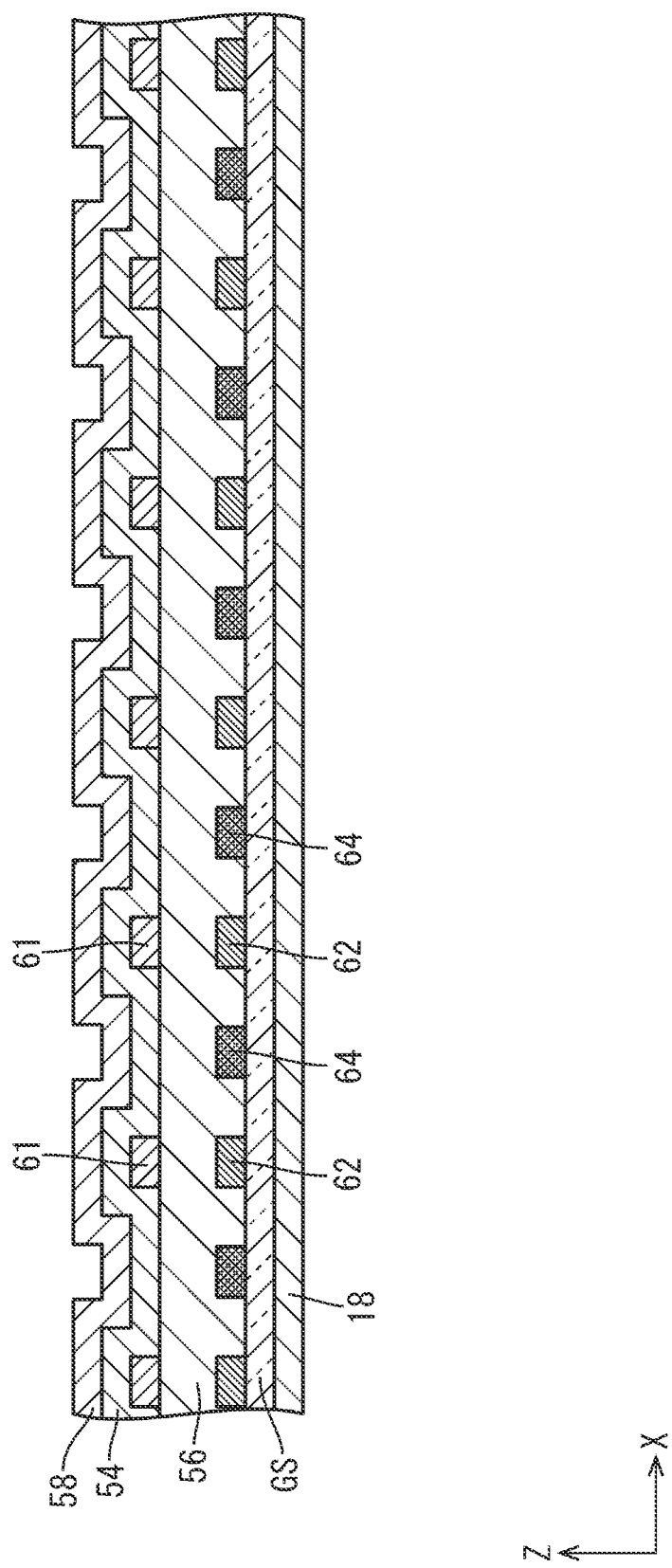
FIG. 12 is a cross-sectional view of draw-out lines in FIG. 1.

In addition, the first draw-out line 61 and the third draw-out line 64 in the non-display area NAA include a gate metal film as shown in the cross-sectional view of FIG. 12. The second draw-out line 62 includes a source metal film. The first draw-out line 61 and the second draw-out line 62 are disposed in different layers in locations where the first draw-out line 61 and the second draw-out line 62 do not overlap the third draw-out line 64. This structure enables reducing the width of the frame and still reduces the load on the third draw-out line 64 connected to the common electrode wire 43. Particularly, as described in Embodiment 2, when the common electrode wire 43 is used also as the sensor electrode wire 143A, the structure facilitates restraining signal distortion on the common electrode wire 43 (sensor electrode wire 143A) and the third draw-out line 64. As a result, display quality and detection precision can be improved.

The gate metal film and source metal film include either a monolayer film of a metal such as copper (Cu) or an alloy or a stack of these films. The gate metal film and source metal film may be made of either the same material or different materials. The gate insulation film 56 and the interlayer insulation films 54, 58 are made of a transparent inorganic insulating material that is a monolayer of, for example, silicon oxide (SiOx), silicon oxynitride (SiON), or silicon nitride (SiNx) or a stack of these films. The semiconductor film 57 is made of, for example, an oxide semiconductor or amorphous silicon. The first and second transparent electrode films are made of a transparent electrode material such as ITO (indium tin oxide) or IZO (indium zinc oxide).

A description is given next of the functions and effects of the active matrix substrate 30 described above. The active matrix substrate 30 includes one first source line 41A, one second source line 41B, one first gate line 42A, one second gate line 42B, and one third gate line 42C for three adjacent columns of pixels. This structure can reduce the number of the source lines 41 in comparison with the more general structure where three source lines 41 and three gate lines 42 are provided for every three columns of pixels. The reduction of the number of the source lines 41 obliterates the need for replacing the source driver 12 for low cost products or increasing the number of the source driver 12. In addition, the frame can be narrowed down. Furthermore, the provision of the common electrode wire 43 in the space that would be otherwise occupied by the eliminated source lines 41 enables reducing the space for accommodating the common electrode wire 43 and increases the aperture ratio because of this reason, in comparison with cases where one common electrode wire 43 is provided between every three source lines 41. Furthermore, as will be described in Embodiment 3, the provision of the sensor electrode wire 143A in the space that would be otherwise occupied by the eliminated source lines 41 enables touch panel functions without using much space.

Figure 13:
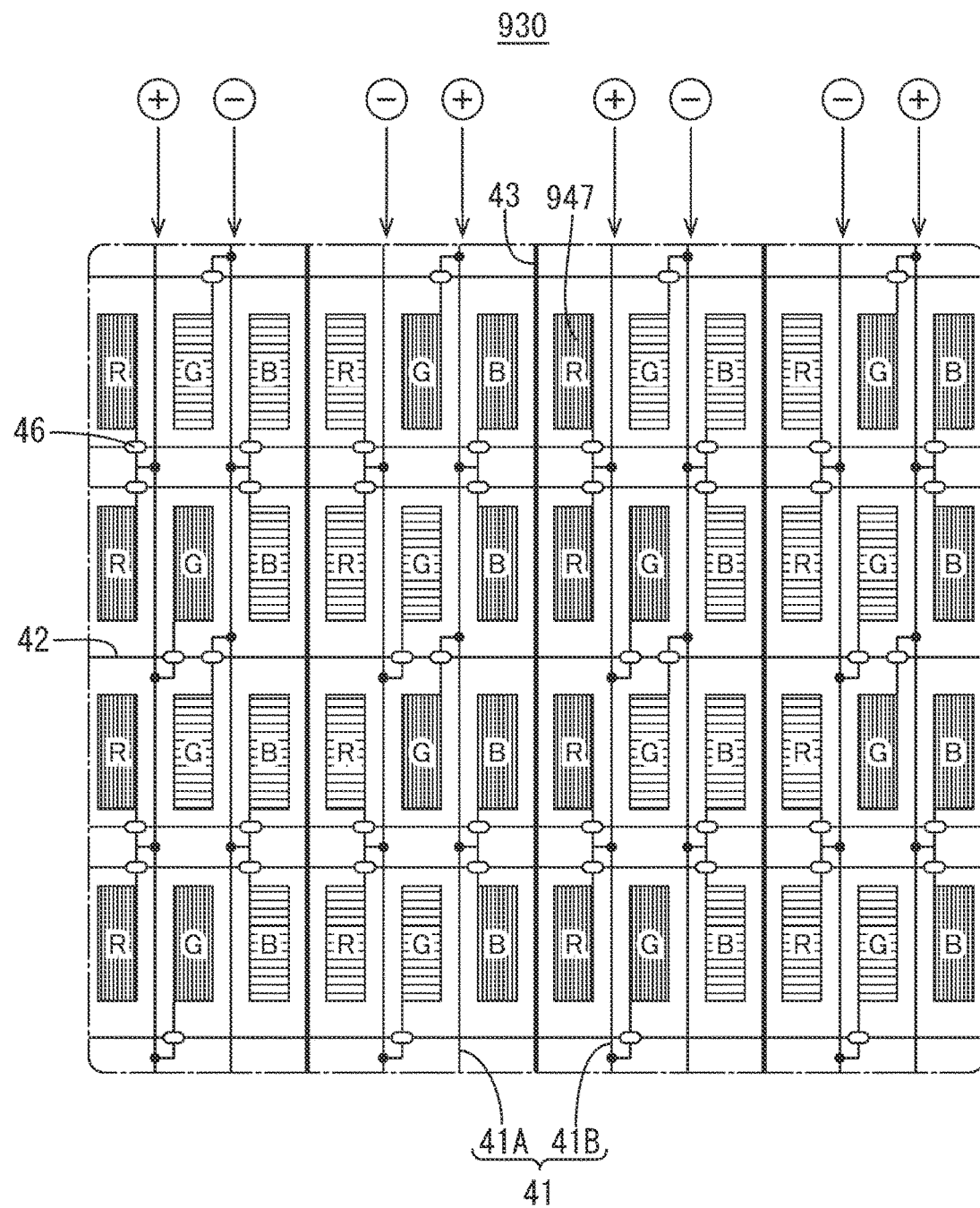
FIG. 13 is a plan view illustrating the voltage polarities of pixel electrodes in an active matrix substrate in accordance with Comparative Example 1.

Meanwhile, the reduction of the number of the source lines 41 inevitably renders flickering and stripe-like improper displays more likely to occur for wiring design reasons. For instance, in an active matrix substrate 930 shown in the plan view of FIG. 13 in accordance with Comparative Example 1, pixel electrodes 947 for the column of R pixels and the column of B pixels are not connected to different source lines 41 via the TFTs 46 depending on the position in the column direction and are connected to the same source line 41. For instance, the pixel electrode 947 for the column of B pixels is connected to the first source line 41A via the TFT 46, but not to the second source line 41B. Unlike the pixel electrode 47 in accordance with the present embodiment, the pixel electrode 947 is not connected to the TFT 46 connected to the second source line 41B via the connection electrode 45. Therefore, the pixel electrode 947 for the column of B pixels is more likely to be biased to one of the voltage polarities, rendering flickering and stripe-like improper displays more likely to occur. Even if data voltages of the same polarity are applied to the first source line 41A and the second source line 41B as shown in FIG. 13, the pixel electrode 947 is likely to be biased to one of the voltage polarities, rendering flickering and stripe-like improper displays likely to occur, because the pixel electrodes 947 for the column of R pixels and the column of B pixels are connected to the same source line 41.

In contrast, in the active matrix substrate 30 in accordance with the present embodiment, the aforementioned structure prevents the pixel electrode 47 from being biased to one of the voltage polarities in the column direction for all of the column of R pixels, the column of G pixels, and the column of B pixels. That in turn enables dot-reversal drive, thereby preventing the pixel electrode 47 from being biased to one of the voltage polarities in both the column direction and the row direction. Flickering and stripe-like improper displays are hence more reliably restrained.

Embodiment 2

Figure 14:
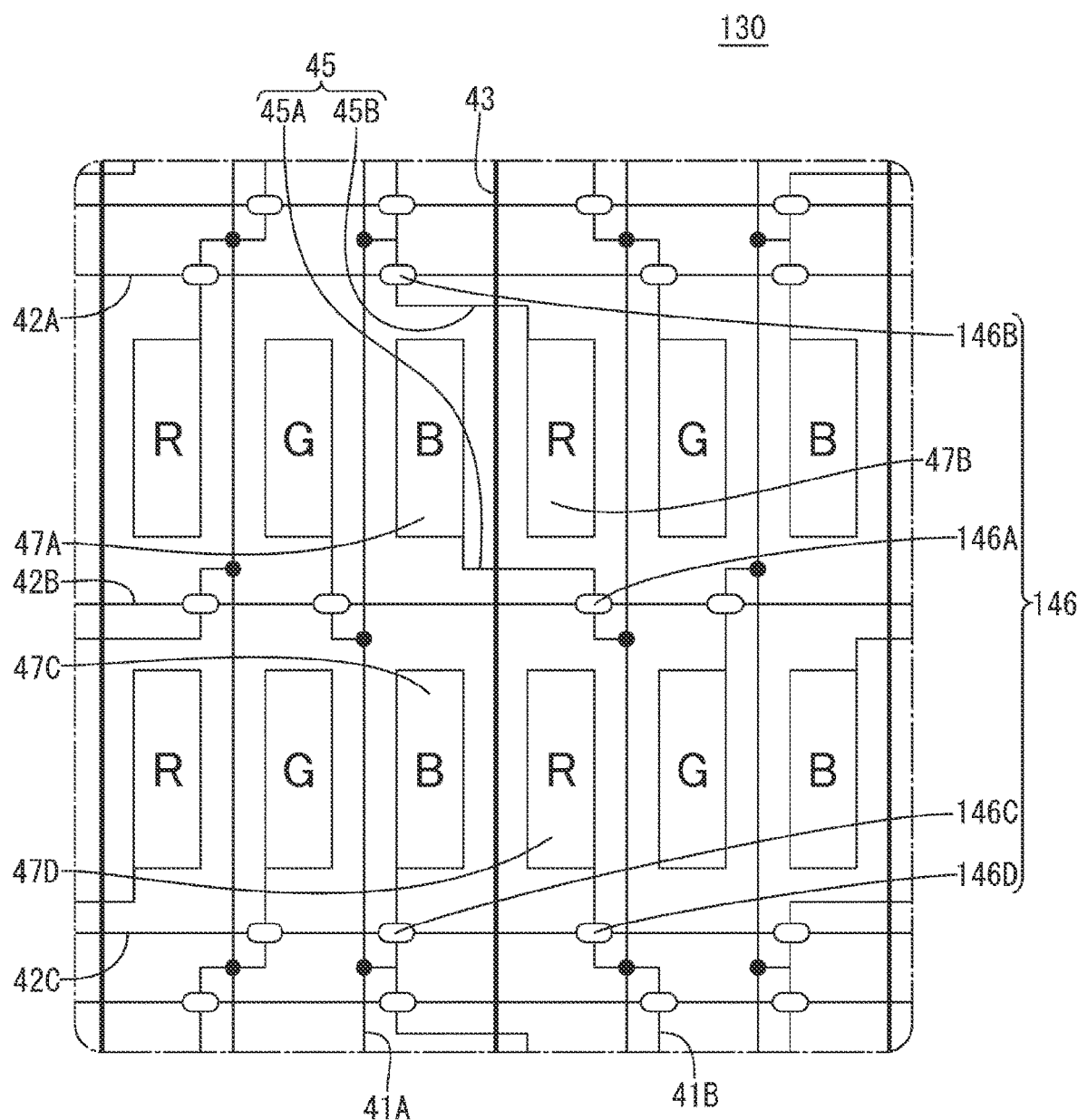
FIG. 14 is a schematic plan view of a structure of a display area of a liquid crystal panel in accordance with another embodiment.

A description is now given to a wiring structure in accordance with Embodiment 2 with reference to the plan view of FIG. 14. The present embodiment differs from Embodiment 1 in, for example, the arrangement of TFTs 146. In Embodiment 2, description of the same structure, functions, and effects as in Embodiment 1 is omitted.

In the present embodiment, a first TFT 146A is connected to the second gate line 42B, a second TFT 146B is connected to the first gate line 42A, and a fourth TFT 146D is connected to the third gate line 42C. A third TFT 146C needs only to be connected to any of the gate lines 42 excluding the first gate line 42A and is connected to the third gate line 42C in the present embodiment.

Embodiment 3

Figure 15:
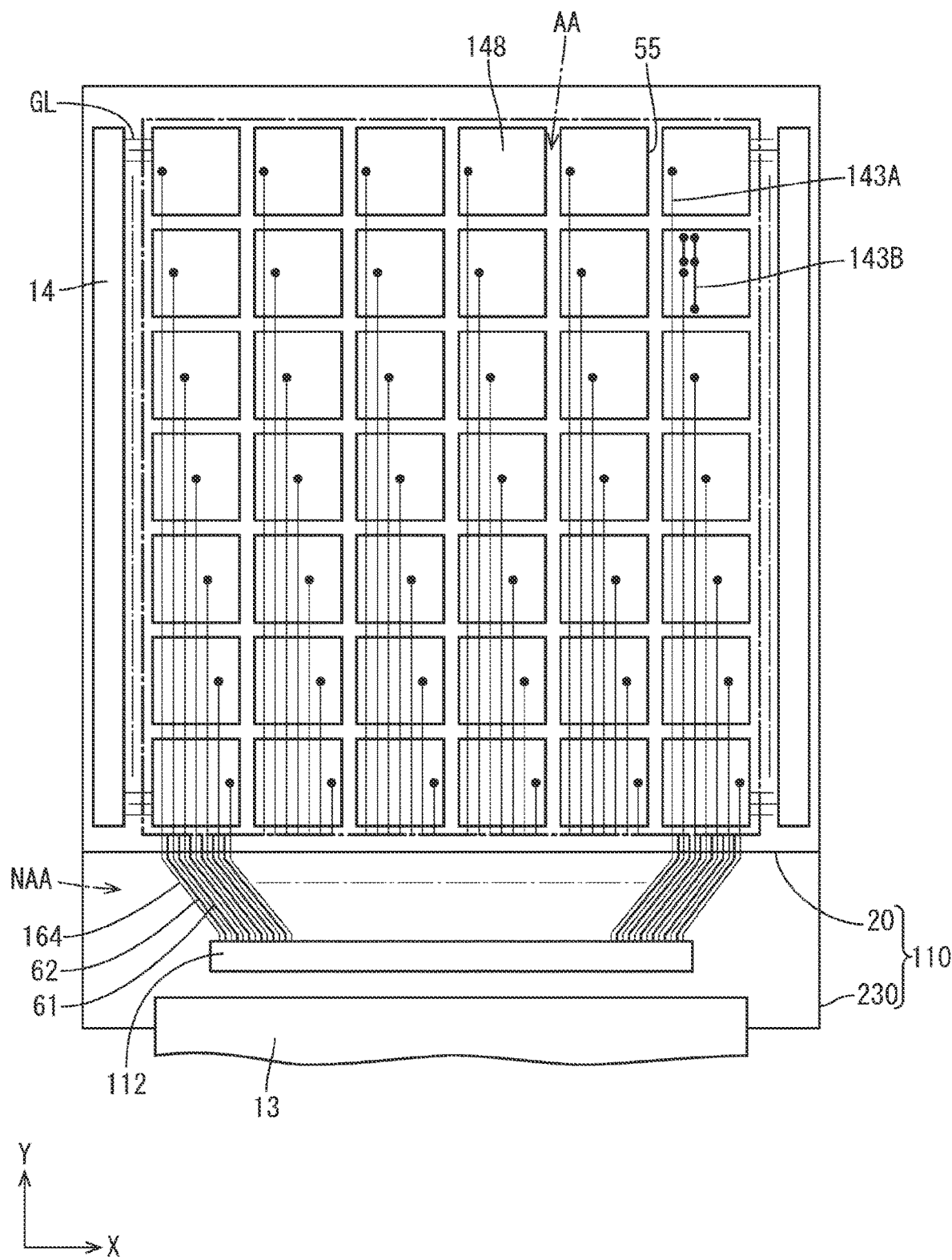
FIG. 15 is a plan view of a liquid crystal panel in accordance with yet another embodiment.
Figure 16:
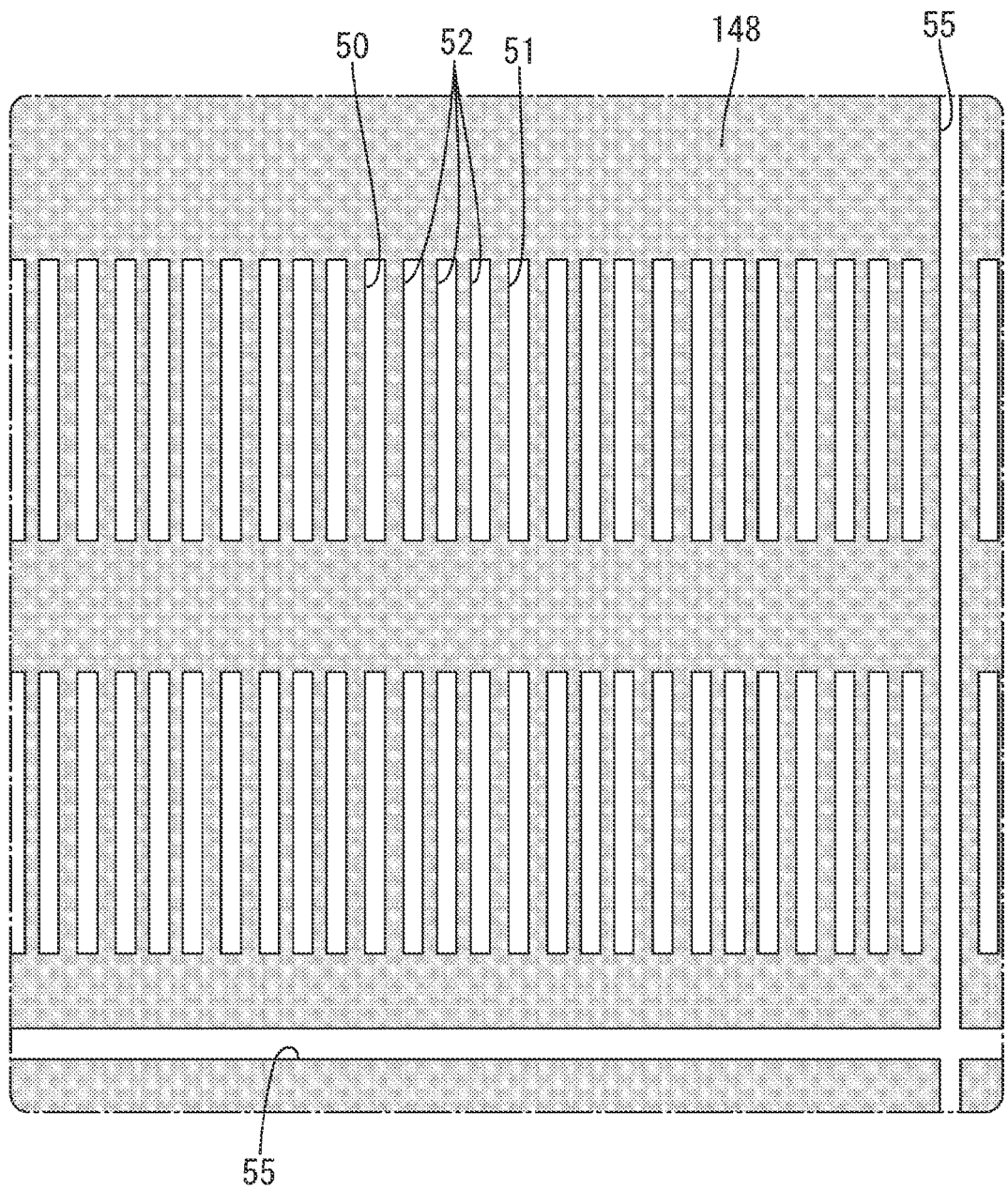
FIG. 16 is a plan view of slits that divide sensor electrodes.
Figure 17:
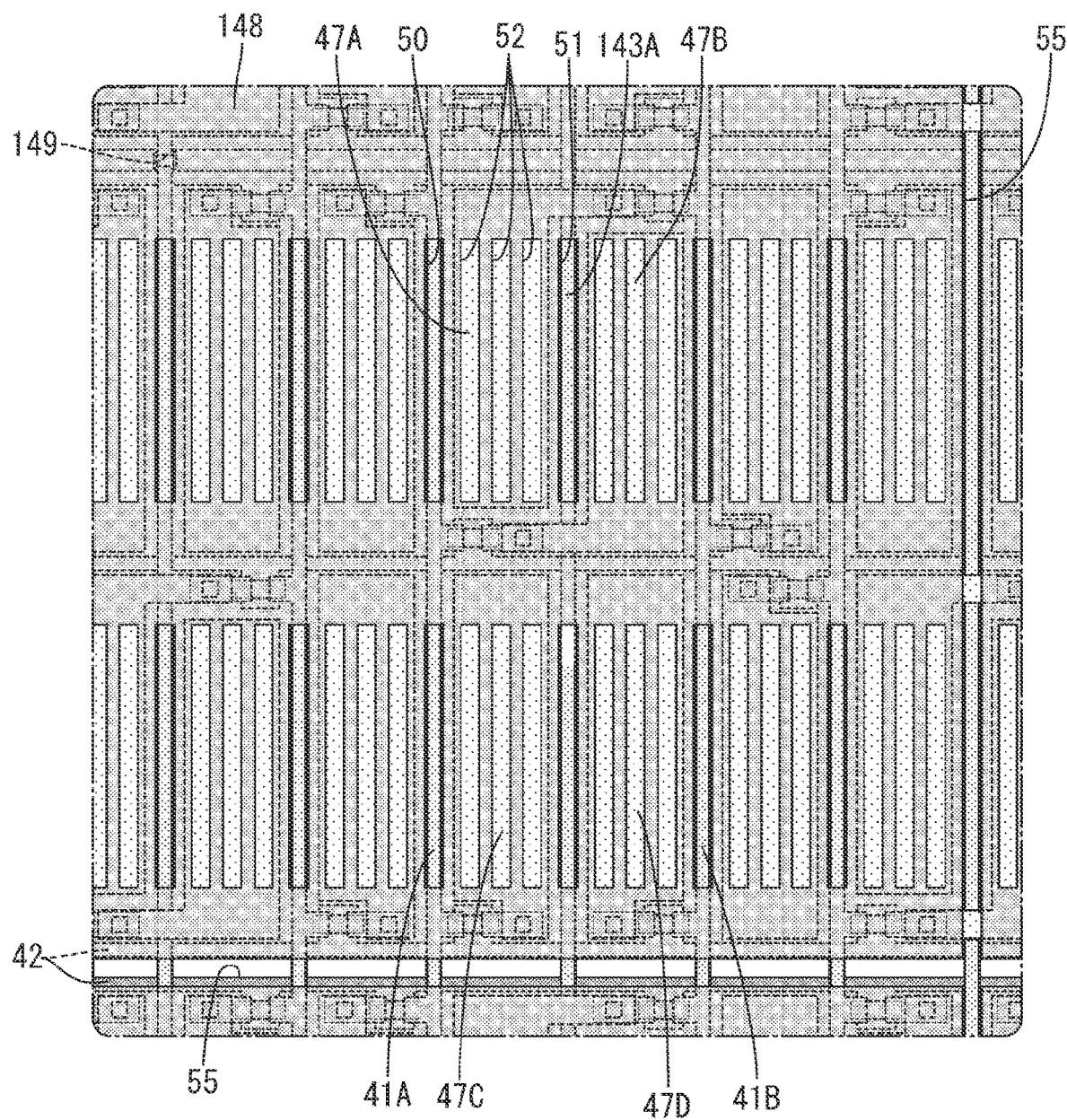
FIG. 17 is a plan view of a wiring layout pattern of a liquid crystal panel in accordance with still another embodiment.

A description is now given to a liquid crystal panel 110 in accordance with Embodiment 3 with reference to the plan views of FIGS. 15 to 17. The liquid crystal panel 110 differs from Embodiment 1 in that the liquid crystal panel 110 has a touch panel function of detecting the position of an input made by the user. In Embodiment 3, description of the same structure, functions, and effects as in Embodiment 1 is omitted.

An active matrix substrate 130, as shown in FIG. 15, includes a plurality of sensor electrodes 148, a plurality of sensor electrode wires 143A (an example of column lines), and a plurality of short-circuit lines 143B (an example of column lines). The sensor electrodes 148 detect the input position and are arranged in a matrix in the display area AA. When the user places his/her finger (a conductive, position input body) close to the front face (display screen) of the liquid crystal panel 110, the finger forms an electrostatic capacitance between the finger and the sensor electrodes 148. Hence, the electrostatic capacitance detected by those sensor electrodes 148 which are close to the finger changes, deviating from the electrostatic capacitance detected by those sensor electrodes 148 which are far from the finger. The input position is detected based on this phenomenon. The liquid crystal panel 110 employs a self-capacitance scheme as a detection scheme in this manner, but may employ a mutual-capacitance scheme.

The sensor electrodes 148 are an equivalent of the common electrode 48 in accordance with Embodiment 1 being divided into rectangular fractions by slits 55. The sensor electrodes 148 double as the common electrode 48. The slits 55 are provided like a lattice in such a manner that the sensor electrode 148 has a far larger plan-view size (e.g., a square with each side from 2 mm from 5 mm) than does the pixel electrode 47. At least some of those slits 55 which extend in the row direction, as shown in FIGS. 16 to 17, overlap a region between two adjacent gate lines 42 that has no pixel electrode 47 being interposed therebetween. In addition, those slits 55 which extend in the column direction overlap at least any one of the source line 41, the sensor electrode wire 143A, and the short-circuit line 143B. The slits 55 can be provided without needing to lower the aperture ratio because these regions overlap the black matrix 23. It should be understood that the capacitance induced in wiring could differ depending on whether or not the slits 55 overlap, which may disadvantageously affect display quality. Therefore, the slits 55 extending in the column direction are preferably provided in such locations as to overlap those wires that affect display quality as little as possible. For instance, when the dummy lines described in another embodiment (1) detailed later are provided, the slits 55 extending in the column direction are preferably provided in such locations as to overlap the dummy lines.

The sensor electrode wires 143A, as shown in FIG. 15, extend in the column direction and are connected to the sensor electrodes 148. The sensor electrode wires 143A double as the common electrode wires 43. At least one sensor electrode wire 143A is connected to each sensor electrode 148. A connection portion 149 where the sensor electrode 148 is connected to the sensor electrode wire 143A is provided in a region where no slit 55 is formed in a region between two gate lines 42 where no pixel electrode 47 is disposed. In other words, the connection portion 149 does not overlap the slit 55.

One sensor electrode wire 143A is provided for every three adjacent columns of pixels, similarly to the common electrode wire 43 in accordance with Embodiment 1. The sensor electrode wire 143A is extended from a third draw-out line 164 to the sensor electrode 148 in the column direction. The sensor electrode wire 143A is connected to a position detection circuit in a source driver 112 via the third draw-out line 164. The sensor electrode wire 143A feeds a reference potential signal related to a display function and a position detection signal related to a touch panel function to the sensor electrode 148 at different timings. The reference potential signal is transmitted to all the sensor electrode wires 143A at the same timing, so that all the sensor electrodes 148 can be at the reference potential and function as the common electrode 48.

As shown in FIG. 15, the short-circuit line 143B, extending in the column direction, is provided on an extension of the sensor electrode wire 143A. The short-circuit line 143B connects (short-circuits) a plurality of points located in each sensor electrodes 148. The length of the short-circuit line 143B is shorter than twice the length of a column-wise side of the sensor electrode 148, and more particularly is approximately equal to or shorter than the length of that side of the sensor electrode 148. The short-circuit line 143B is not fed with a signal from the source driver 12. The short-circuit lines 143B facilitate instantly equalizing potential in each sensor electrode 148, thereby improving detection precision.

According to the present embodiment, the provision of the sensor electrode wires 143A and the short-circuit lines 143B in the space that would be otherwise occupied by the eliminated source lines 41 can save space and achieve a highly precise touch panel function.

Embodiment 4

Figure 18:
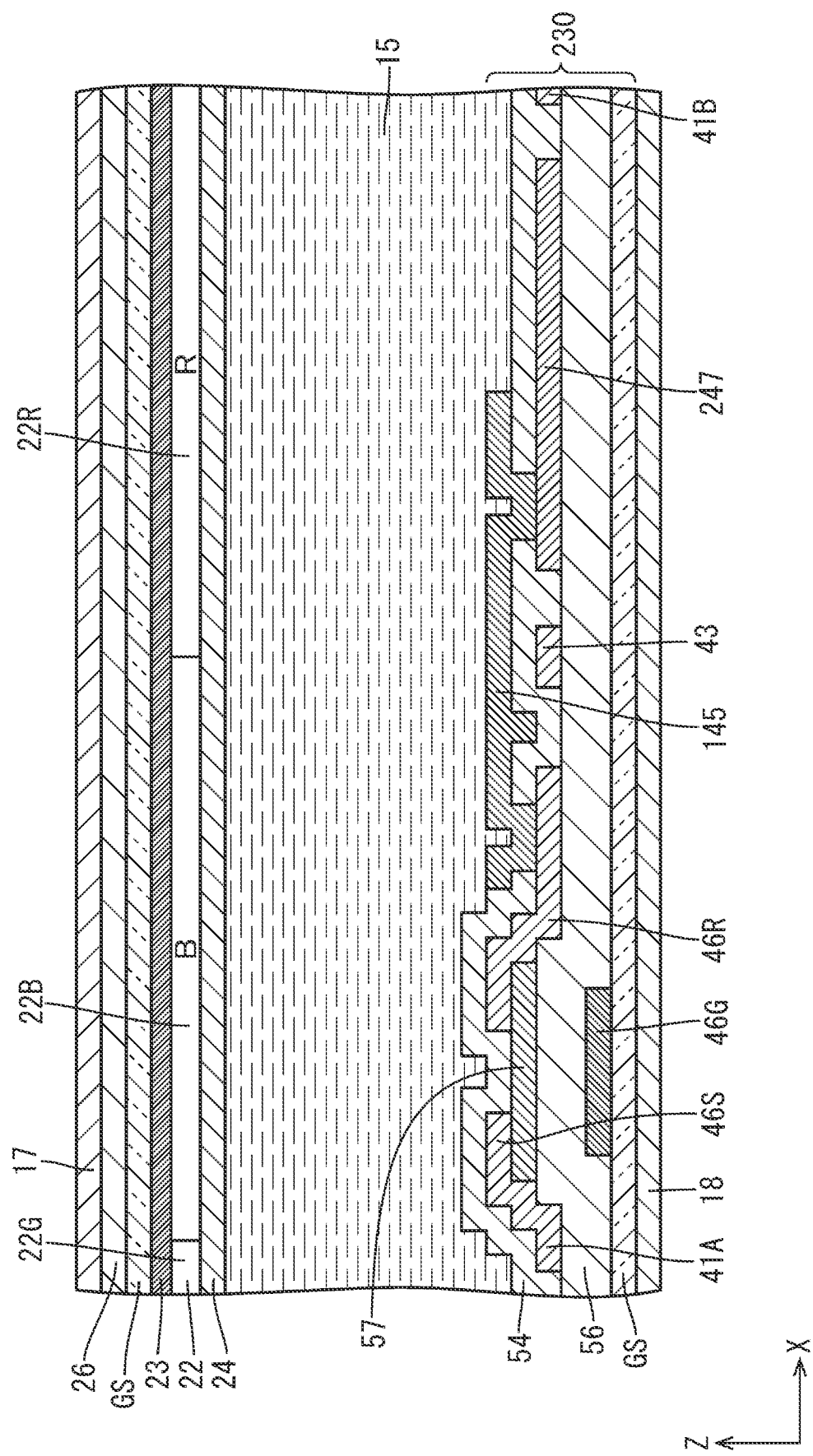
FIG. 18 is a cross-sectional view of a liquid crystal panel in accordance with yet still another embodiment taken along line I-I shown in FIGS. 6 and 8.
Figure 19:
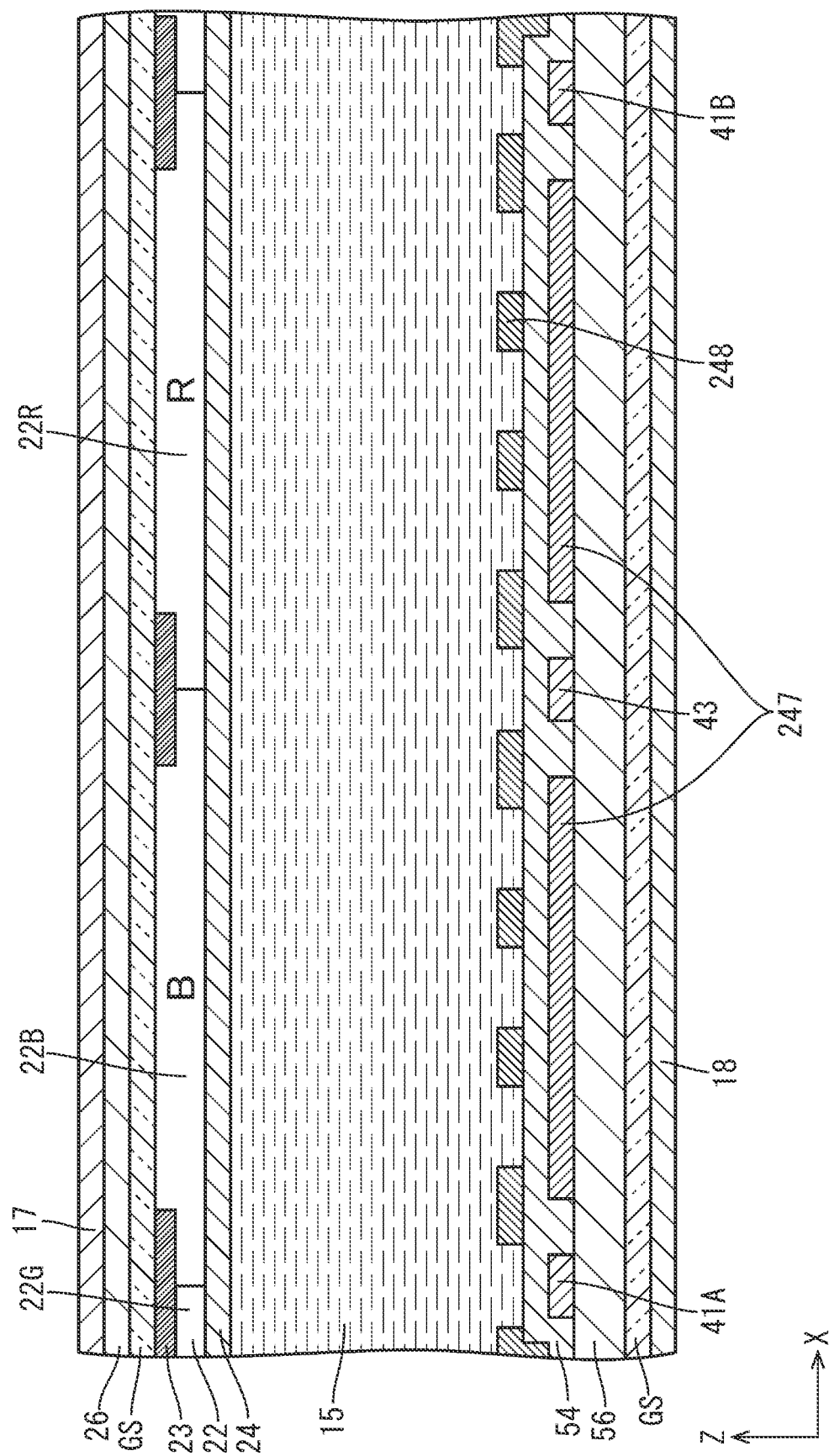
FIG. 19 is a cross-sectional view of a liquid crystal panel in accordance with still a further embodiment taken along line II-II shown in FIGS. 6 and 8.
Figure 20:
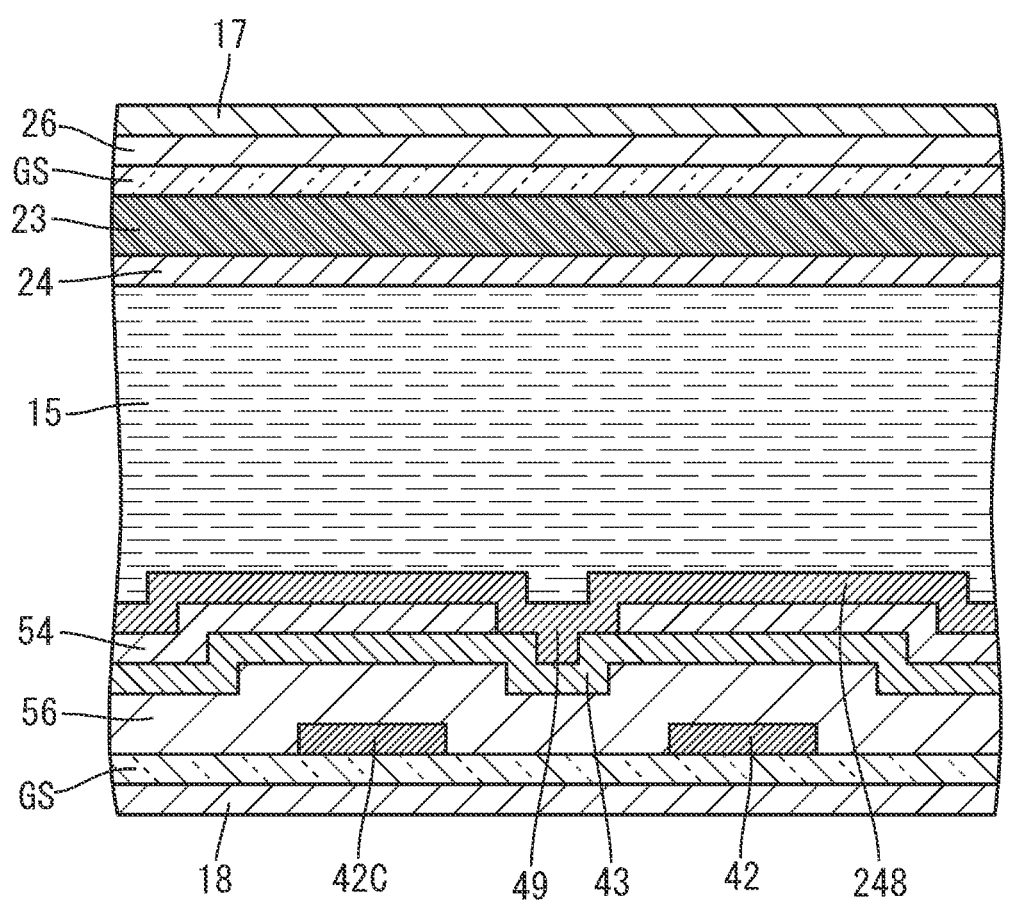
FIG. 20 is a cross-sectional view of a liquid crystal panel in accordance with yet a further embodiment taken along line shown in FIGS. 6 and 8.

A description is now given to a liquid crystal panel 210 in accordance with Embodiment 4 with reference to the cross-sectional views of FIGS. 18 to 20. The liquid crystal panel 210 differs from Embodiment 1 in the layer structure of an active matrix substrate 230 and the structure of connection electrodes 145. In Embodiment 4, description of the same structure, functions, and effects as in Embodiments 1 to 3 is omitted.

In the active matrix substrate 230, as shown in FIG. 18, a pixel electrode 247 including a first transparent electrode film is stacked in the same layer as the source electrode 46S (including a source metal film), the drain electrode 46R, the source line 41, and the common electrode wire 43. The first transparent electrode film is formed on the gate insulation film 56. In addition, the first interlayer insulation film 54 is formed on the first transparent electrode film and the source metal film. A common electrode 248 includes a second transparent electrode film stacked on the first interlayer insulation film 54.

Unlike Embodiment 1, the connection electrode 145 is provided as a member separated from the pixel electrode 247. The connection electrode 145 includes the same second transparent electrode film as the common electrode 248 and is provided in the same layer as the common electrode 248. Each connection electrode 145 has an edge portion connected through a layer to the pixel electrode 247 and another edge portion connected through a layer to the drain electrode 46R. The connection electrode 145 straddles the common electrode wire 43 to connect the pixel electrode 247 and the drain electrode 46R and intersects with the common electrode wire 43 via the first interlayer insulation film 54. Note that since the connection electrodes 145 are formed by patterning the second transparent electrode film from which the common electrode 248 is formed, the common electrode 248 has openings so as not to be electrically connected to the connection electrodes 145.

According to the present embodiment, unlike Embodiment 1, since no second interlayer insulation film needs to be provided, the manufacturing steps can be reduced. In addition, the strength of the lateral component (in-plane component) of the fringe field can be more easily increased. Furthermore, since the connection electrodes 145 are formed of the second transparent electrode film as members separated from the pixel electrodes 247, it becomes easier to render common the pattern shape of the portion of the first transparent electrode film that includes the pixel electrodes 247.

Embodiment 5

Figure 21:
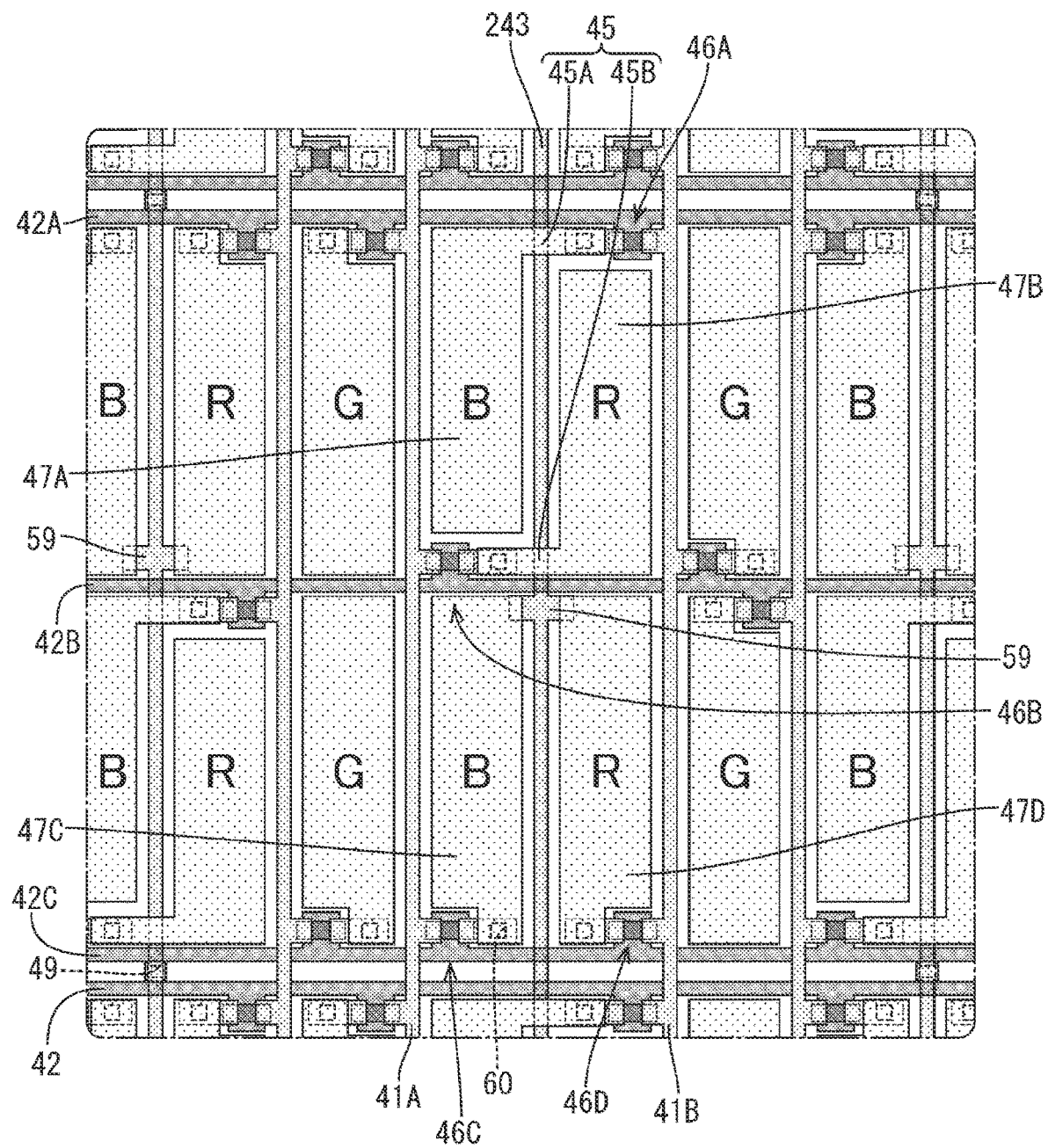
FIG. 21 is a plan view of a wiring layout pattern of a liquid crystal panel in accordance with still a further embodiment.

A description is now given to a wiring layout pattern for an active matrix substrate 330 in accordance with Embodiment 5 with reference to the plan view of FIG. 21. The active matrix substrate 330 differs from Embodiment 1 in that a common electrode wire 243 includes an overlapping portion 59. In Embodiment 5, description of the same structure, functions, and effects as in Embodiments 1 to 4 is omitted.

The auxiliary capacitance C45 is produced between the connection electrode 45 and the common electrode wire 243 as described in Embodiment 1. Therefore, the capacitance of the pixel electrode 47 differs by as much as the auxiliary capacitance C45 between the pixel PIX including the first pixel electrode 47A or the second pixel electrode 47B connected to the connection electrode 45 and the pixel PIX including the third pixel electrode 47C or the fourth pixel electrode 47D not connected to the connection electrode 45, which could lead to flickering and improper displays such as image sticking.

Accordingly, the active matrix substrate 330 in accordance with the present embodiment has a structure in which a capacitance with a magnitude approximately equal to the auxiliary capacitance C45 is deliberately produced at the third pixel electrode 47C and the fourth pixel electrode 47D for capacitance matching. Specifically, as shown in FIG. 21, the overlapping portion 59 overlapping the third pixel electrode 47C and the fourth pixel electrode 47D is provided in a part of the common electrode wire 243 that intersects with the connection electrode 45. The overlapping portion 59 includes those parts of the common electrode wire 243 which project leftward and rightward to locations overlapping the third pixel electrode 47C and the fourth pixel electrode 47D respectively. The overlapping portion 59 overlaps the third pixel electrode 47C and the fourth pixel electrode 47D, but is not connected through a layer to the third pixel electrode 47C and the fourth pixel electrode 47D. This structure enables equalizing the capacitances of the pixel electrodes 47 between the pixels PIX, thereby restraining flickering and improper displays such as image sticking.

The shape and size of the overlapping portion 59 are adjusted so as to equalize the capacitances of the pixel electrodes 47. Alternatively, the shape and size of the connection electrode 45 may be adjusted.

The overlapping portion 59 may be disposed in a location other than that shown in FIG. 21 (diagonal to the third TFT 46C and the fourth TFT 46D) so long as the overlapping portion 59 can produce a capacitance with a magnitude approximately equal to the auxiliary capacitance C45. Any location is acceptable that ensures a space for accommodating the overlapping portion 59 in a region overlapping the black matrix 23. For instance, the overlapping portion 59 may be disposed in a location adjacent to an interlayer connection portion 60 for the third pixel electrode 47C, the fourth pixel electrode 47D, and the drain electrode 46R connected to these electrodes.

Note that the overlapping portion 59 does not necessarily overlap both the third pixel electrode 47C and the fourth pixel electrode 47D, and needs only to overlap at least either the third pixel electrode 47C or the fourth pixel electrode 47D. Furthermore, the overlapping portion 59 may be disposed in a location other than the common electrode wire 243. For instance, the overlapping portion for the common electrode wire 243 may be provided in the third pixel electrode 47C and the fourth pixel electrode 47D. Additionally, for example, when the layer structure of Embodiment 4 is used, the overlapping portion may be formed using the second transparent electrode film that is in the same layer as the connection electrodes 45.

OTHER EMBODIMENTS

The subject technology is not necessarily limited to the foregoing description and embodiments described with reference to drawings. As an example, the following embodiments are also encompassed in the technical scope of the present invention.

(1) The column lines that intersect with the connection electrodes 45, 145 are not limited to the common electrode wires 43, 243, the sensor electrode wires 143A, and the short-circuit lines 143B. For instance, such column lines may be those lines which are not connected to the common electrode 48, 248 and the sensor electrodes 148, but to which signals are applied that are similar to the reference potential signal and the position detection signal. In addition, such column lines may be electrically floating dummy lines that are not fed with any signals. Note that when such column lines are dummy lines, since no auxiliary capacitance C45 is produced, the structure for capacitance matching described in Embodiment 5 (specifically, the overlapping portions 59) is unnecessary.

(2) The structure of the active matrix substrates 30, 130, 230, 330 in the display area is not limited to the examples of FIGS. 3, 14.

(3) The layer structure of the active matrix substrates 30, 130, 230, 330 may be another structure. For instance, as shown in the cross-sectional views of FIGS. 22 to 24, the first transparent electrode film may be stacked on the glass substrate GS, the pixel electrodes 47 and the connection electrodes 45 may be provided by patterning, and the gate electrodes 46G including the gate metal film and the gate insulation film (an example of an insulation layer) may be sequentially stacked on the first transparent electrode film. This structure obliterates the need to provide the second interlayer insulation film, thereby reducing the number of manufacturing steps.

Figure 25:
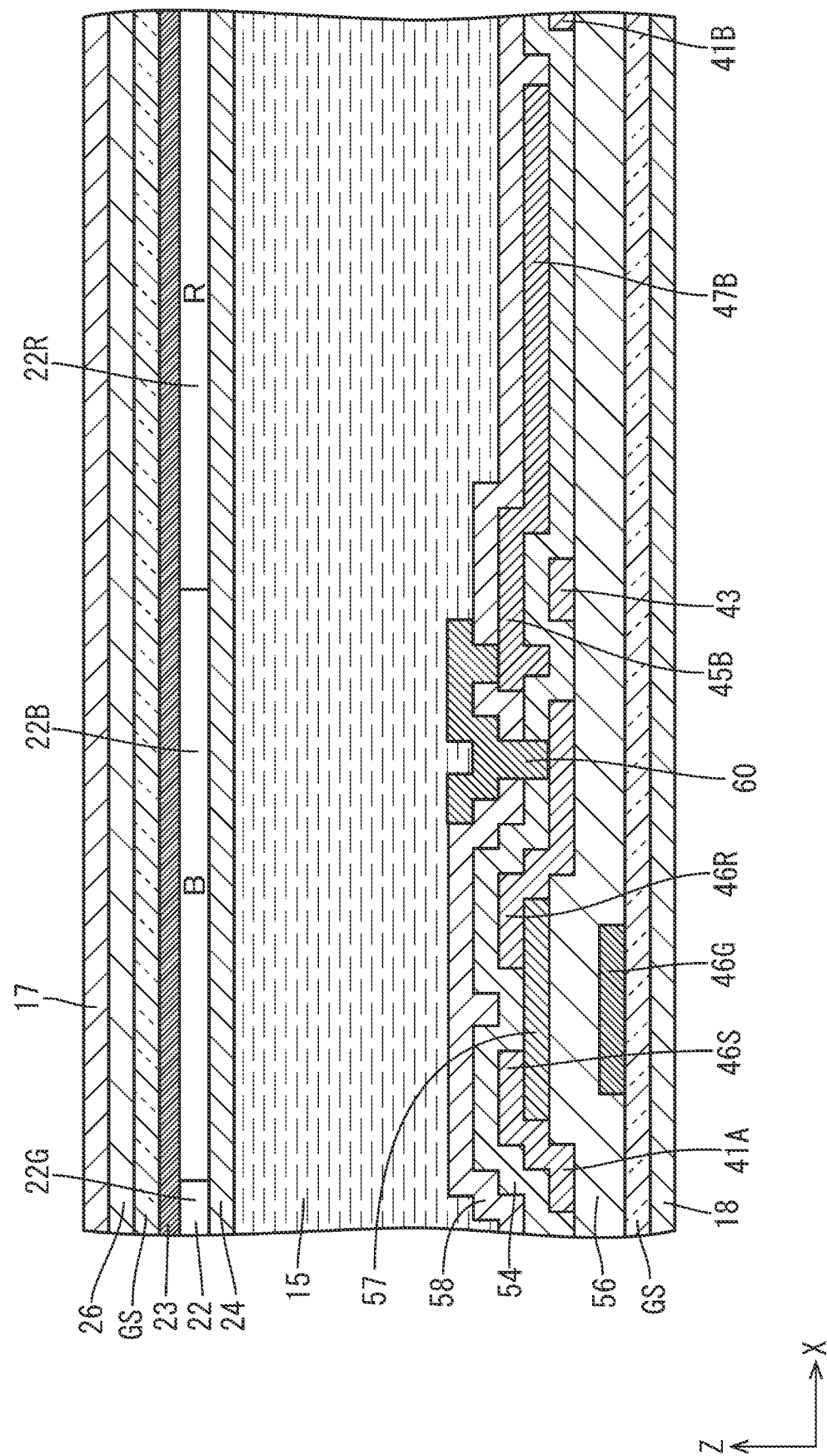
FIG. 25 is a cross-sectional view of a liquid crystal panel in accordance with yet another embodiment taken along line I-I shown in FIGS. 6 and 8.

(4) Additionally, for example, as shown in the cross-sectional view of FIG. 25, the interlayer connection portions 60 between the pixel electrodes 47 and the drain electrodes 46R may be formed by the second transparent electrode film that is the same layer as the common electrode 48. The common electrode 48 has openings formed not to be electrically connected to these interlayer connection portions 60. This structure enables integrating the step of forming contact holes in the first interlayer insulation film 54 and the step of forming contact holes in the second interlayer insulation film, thereby reducing the number of the photomasks used and reducing the number of manufacturing steps.

Figure 22:
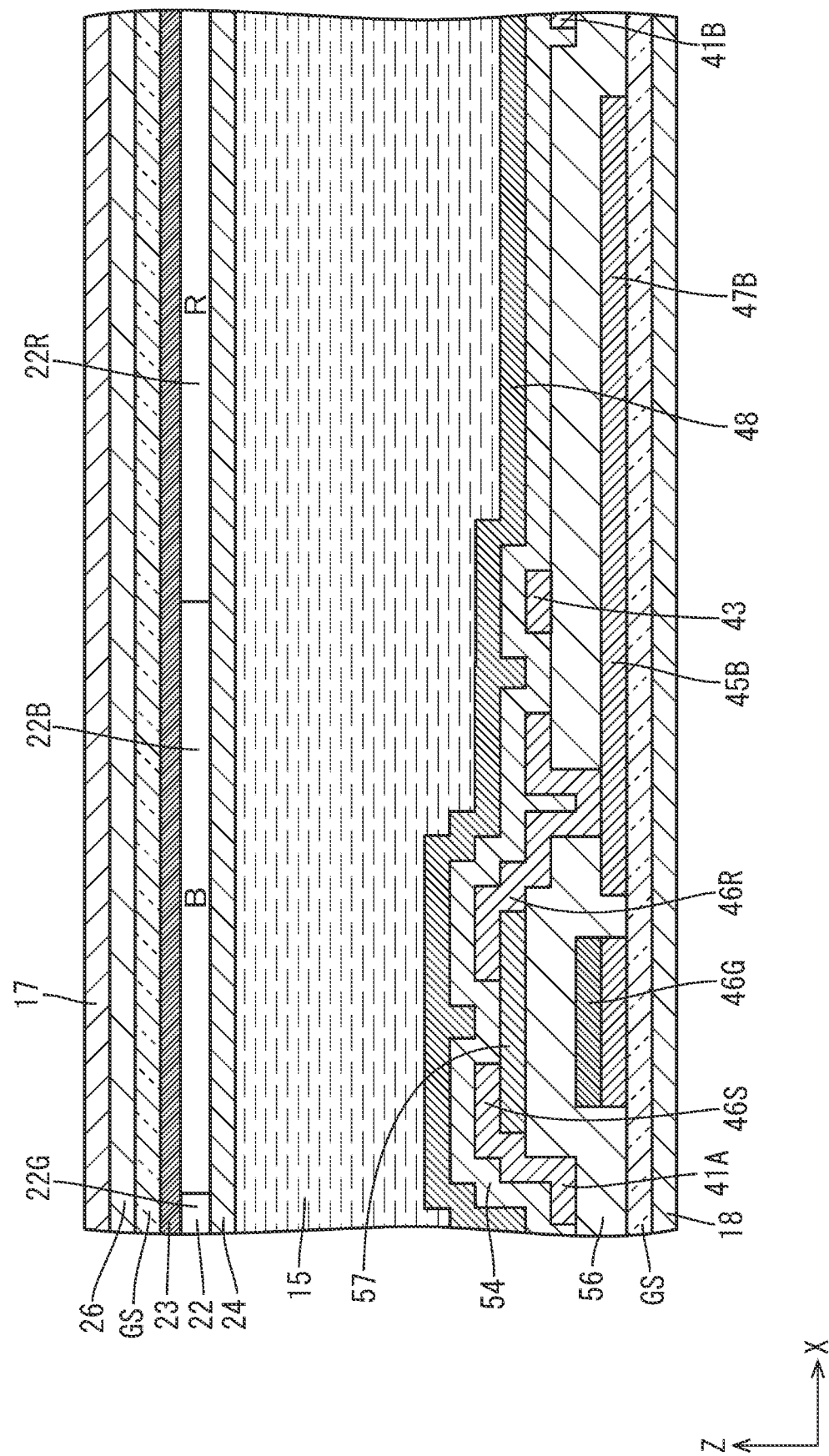
FIG. 22 is a cross-sectional view of a liquid crystal panel in accordance with yet still a further embodiment taken along line I-I shown in FIGS. 6 and 8.
Figure 23:
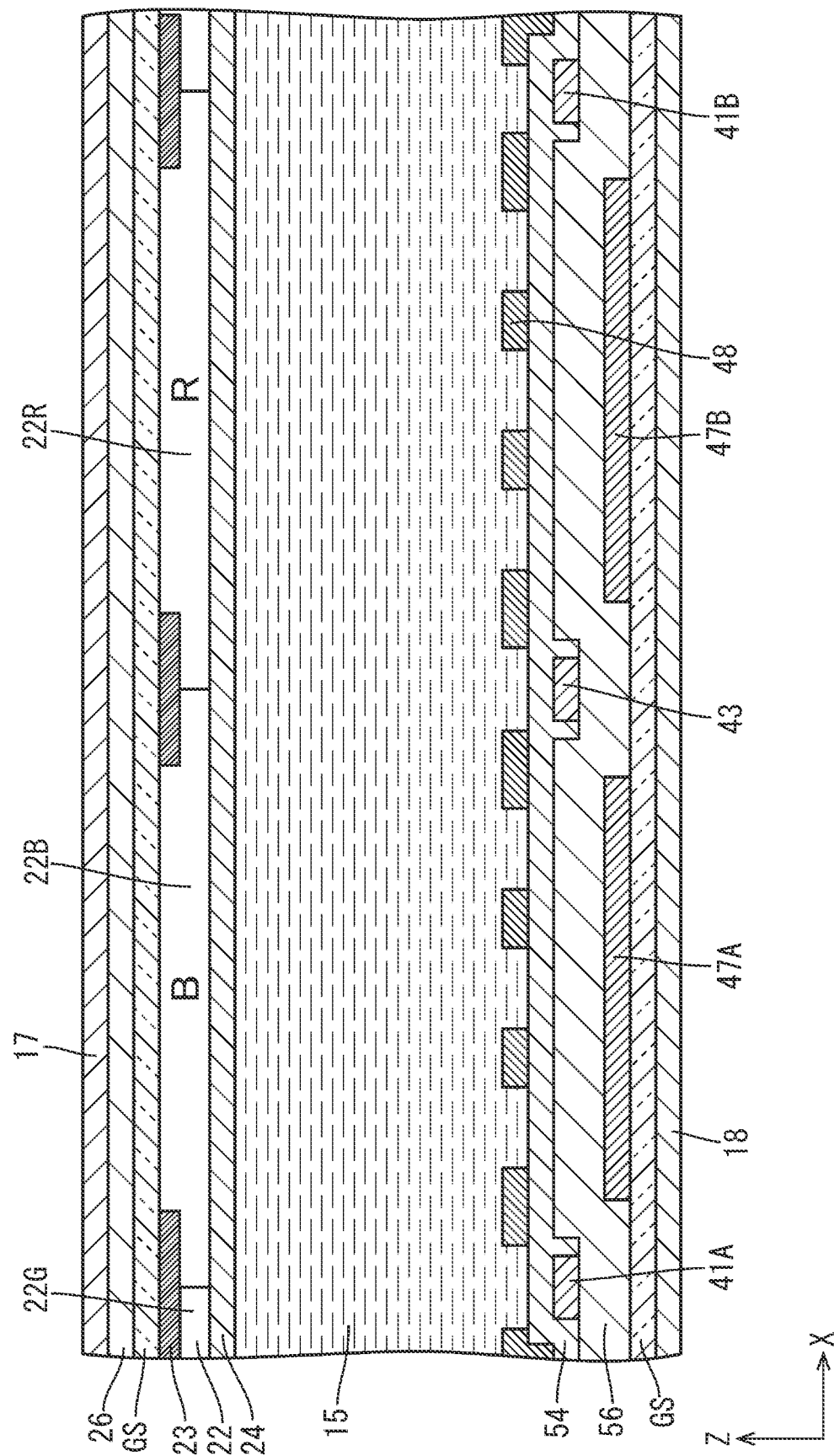
FIG. 23 is a cross-sectional view of a liquid crystal panel in accordance with an additional embodiment taken along line II-II shown in FIGS. 6 and 8.
Figure 26:
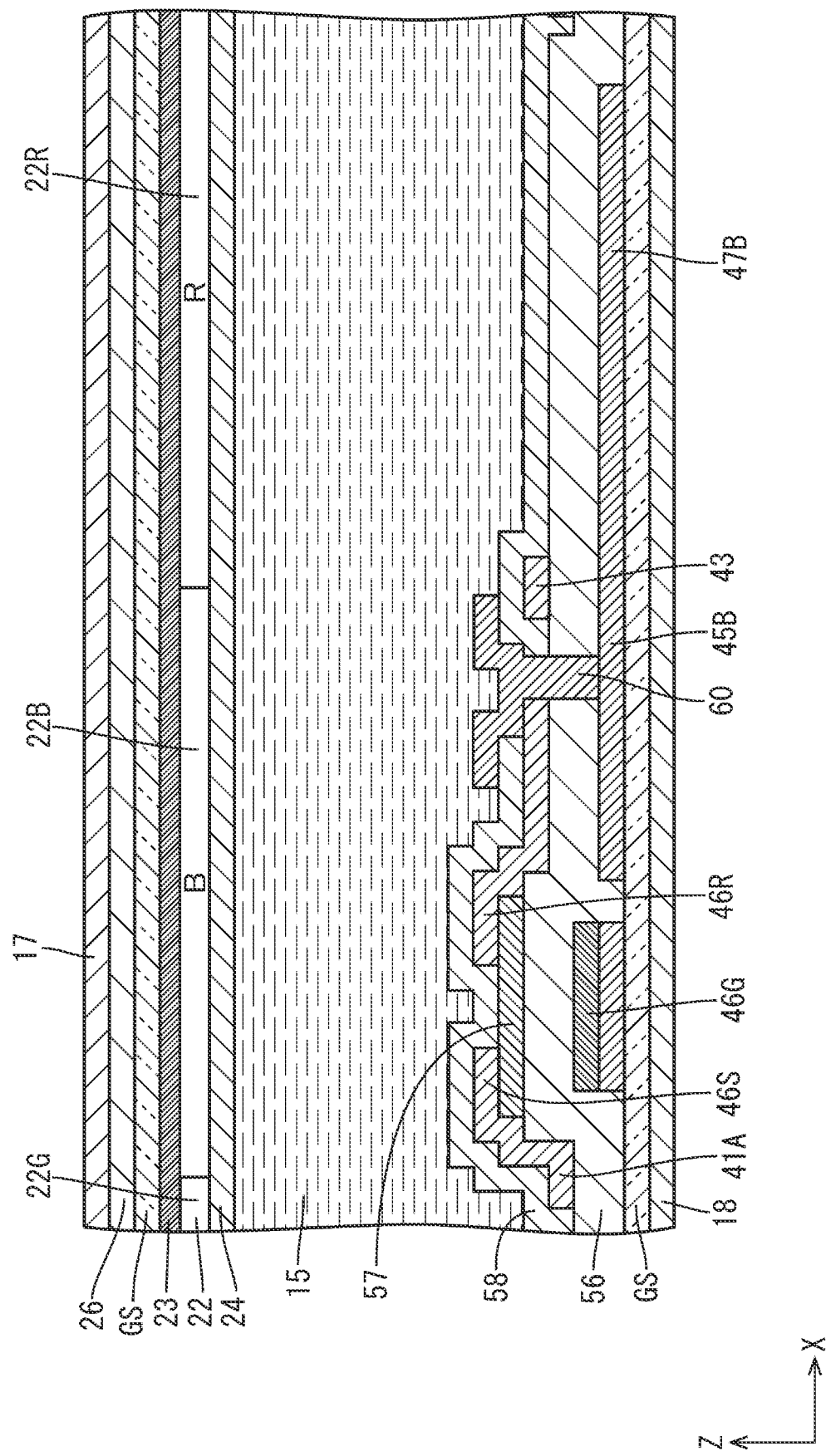
FIG. 26 is a cross-sectional view of a liquid crystal panel in accordance with still another embodiment taken along line I-I shown in FIGS. 6 and 8.

(5) Additionally, for example, the aforementioned layer structures shown in FIGS. 22 and 25 may be combined to provide the layer structure shown in the cross-sectional view of FIG. 26.

Figure 27:
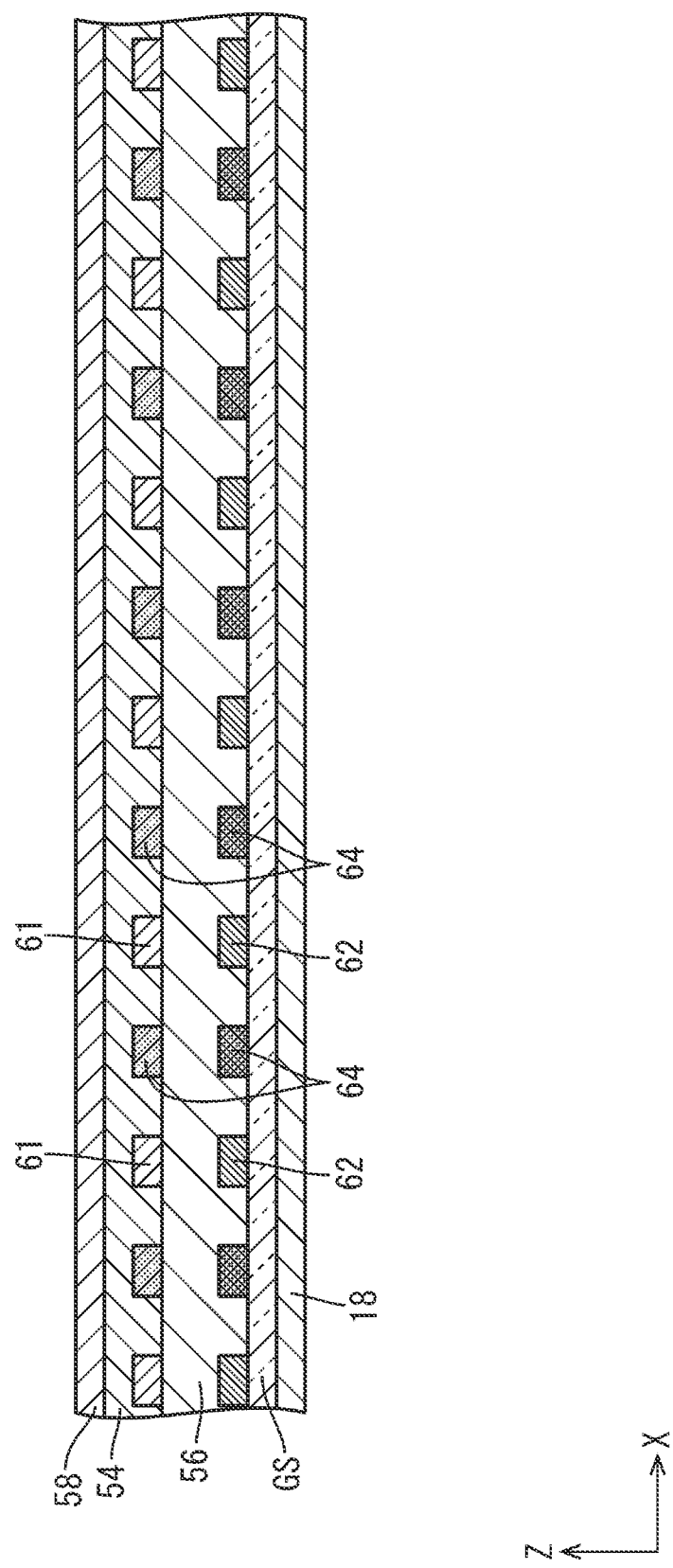
FIG. 27 is a cross-sectional view of draw-out lines in accordance with yet still another embodiment.

(6) Additionally, for example, the third draw-out lines 64, 164 in the non-display area NAA may have a multilayer structure in which two layers (i.e., the gate metal film and the source metal film) are provided as shown in the cross-sectional view of FIG. 27. This multilayer structure enables reducing the resistance of the third draw-out lines 64, 164, thereby further facilitating restraining signal distortion. As a result, display quality and detection precision can be improved.

What is claimed is:

1. An active matrix substrate comprising:
a plurality of gate lines extending in a first direction;
a plurality of source lines extending in a second direction that intersects with the first direction;
a plurality of column lines extending in the second direction;
a plurality of switching elements each being connected to one of the plurality of gate lines and one of the plurality of source lines;
a plurality of pixel electrodes respectively connected to the plurality of switching elements, the plurality of pixel electrodes being arranged in a matrix in the first direction and in the second direction; and
a plurality of connection electrodes that intersect with one of the plurality of column lines via an insulation layer, wherein
the plurality of gate lines include a first gate line, a second gate line, and a third gate line,
the plurality of source lines include a first source line and a second source line,
the plurality of pixel electrodes include a first pixel electrode and a second pixel electrode both disposed in a first row that is parallel to the first direction and a third pixel electrode and a fourth pixel electrode both disposed in a second row that is adjacent to the first row,
the plurality of switching elements include a first switching element, a second switching element, a third switching element, and a fourth switching element,
the plurality of connection electrodes include a first connection electrode and a second connection electrode,
the first pixel electrode and the third pixel electrode are disposed on one side of the one of the plurality of column lines,
the second pixel electrode and the fourth pixel electrode are disposed on another side of the one of the plurality of column lines,
the third switching element is disposed on the one side of the one of the plurality of column lines,
the fourth switching element is disposed on the other side of the one of the plurality of column lines,
the first pixel electrode is connected to the first switching element via the first connection electrode,
the second pixel electrode is connected to the second switching element via the second connection electrode,
the third pixel electrode is connected to the third switching element, and
the fourth pixel electrode is connected to the fourth switching element.

2. The active matrix substrate according to claim 1, wherein
the first switching element and the second switching element are connected to mutually different gate lines included in the plurality of gate lines and to mutually different source lines included in the plurality of source lines, and
the third switching element and the fourth switching element are connected to mutually different source lines included in the plurality of source lines.

3. The active matrix substrate according to claim 1, wherein
the first switching element is connected to the first gate line and the second source line,
the second switching element is connected to the second gate line and the first source line,
the third switching element is connected to one of the plurality of gate lines excluding the second gate line and to the first source line, and
the fourth switching element is connected to the third gate line and the second source line.

4. The active matrix substrate according to claim 1, wherein
the first switching element is connected to the second gate line and the second source line,
the second switching element is connected to the first gate line and the first source line,
the third switching element is connected to one of the plurality of gate lines excluding the first gate line and to the first source line, and
the fourth switching element is connected to the third gate line and the second source line.

5. The active matrix substrate according to claim 1, wherein the third switching element is connected to the third gate line.

6. The active matrix substrate according to claim 1, wherein when the first source line is fed with a first data voltage, and the second source line is fed with a second data voltage having an opposite polarity to the first data voltage, adjacent pixel electrodes in the plurality of pixel electrodes have different voltage polarities both in the first direction and in the second direction.

7. The active matrix substrate according to claim 1, wherein the one of the plurality of column lines that intersects with the first connection electrode and the second connection electrode overlaps either one or both of the third pixel electrode and the fourth pixel electrode.

8. The active matrix substrate according to claim 7, wherein the plurality of column lines include a projection that projects toward either one or both of the third pixel electrode and the fourth pixel electrode in such a manner that the projection overlaps either one or both of the third pixel electrode and the fourth pixel electrode.

9. The active matrix substrate according to claim 1, wherein the first connection electrode and the second connection electrode are provided respectively integral to the first pixel electrode and the second pixel electrode.

10. The active matrix substrate according to claim 1, wherein the plurality of connection electrodes are provided as members separated from the first pixel electrode and the second pixel electrode.

11. The active matrix substrate according to claim 1, further comprising at least one common electrode configured to feed a prescribed reference potential, wherein the one of the plurality of column lines is a common electrode wire connected to the common electrode.

12. The active matrix substrate according to claim 11, wherein the plurality of connection electrodes are partially disposed in a same layer as the common electrode.

13. The active matrix substrate according to claim 11, wherein the common electrode includes: a plurality of first openings respectively overlapping the plurality of source lines; and a second opening overlapping the common electrode wire.

14. The active matrix substrate according to claim 11, wherein
the common electrode includes a connection portion connected to the common electrode wire,
the connection portion overlaps a region between two adjacent gate lines included in the plurality of gate lines, and none of the plurality of pixel electrodes are disposed in the region between the two adjacent gate lines.

15. The active matrix substrate according to claim 1, further comprising at least one common electrode configured to feed a prescribed reference potential, wherein
the common electrode is divided into a matrix by a slit so as to double as a plurality of sensor electrodes capable of detecting a touch position, and
the one of the plurality of column lines doubles as a sensor electrode wire connected to one of the plurality of sensor electrodes.

16. The active matrix substrate according to claim 15, wherein the plurality of column lines include a short-circuit line connecting a plurality of points in each of the plurality of sensor electrodes and having a length shorter than twice a length of the plurality of sensor electrodes in the second direction.

17. The active matrix substrate according to claim 15, wherein
the common electrode includes a connection portion connected to the sensor electrode wire,
the slit partially overlaps a region between two adjacent gate lines included in the plurality of gate lines,
none of the plurality of pixel electrodes are disposed in the region between the two adjacent gate lines, and
the slit does not overlap the connection portion.

18. The active matrix substrate according to claim 1, further comprising at least one common electrode configured to feed a prescribed reference potential, wherein
the one of the plurality of column lines is a common electrode wire connected to the common electrode,
the active matrix substrate further comprising:
a source driver configured to feed a data voltage to the plurality of source lines;
a first draw-out line connecting the first source line and the source driver;
a second draw-out line connecting the second source line and the source driver; and
a third draw-out line connecting the common electrode wire and the source driver,
the first draw-out line and the third draw-out line at least partially include a first metal film, and
the second draw-out line includes a second metal film disposed in a different layer than the first metal film.

19. The active matrix substrate according to claim 18, wherein the third draw-out line has a multilayer structure including the first metal film and the second metal film.

20. A display panel comprising:
the active matrix substrate according to claim 1; and
a color filter including a plurality of coloring sections opposite the plurality of pixel electrodes, wherein
the plurality of coloring sections include a first coloring section, a second coloring section, and a third coloring section of mutually different colors, and
in the plurality of coloring sections, the first coloring section, the second coloring section, and the third coloring section are arranged in a repetitive pattern in a fixed order in the first direction in such a manner that a same color appears in the second direction.

* * * * *